United States Patent
Menke-Berg et al.

(10) Patent No.: US 12,234,177 B2
(45) Date of Patent: Feb. 25, 2025

(54) COATED GLASS OR GLASS CERAMIC SUBSTRATE, COATING COMPRISING CLOSED PORES, AND METHOD FOR COATING A SUBSTRATE

(71) Applicant: SCHOTT AG, Mainz (DE)

(72) Inventors: Yvonne Menke-Berg, Wiesbaden (DE); Stephanie Mangold, Klein-Winternheim (DE); Matthias Bockmeyer, Mainz (DE); Vera Steigenberger, Bischofsheim (DE); Adam O'Ryan, Sweetwater, TN (US); Matthew Moose, Sweetwater, TN (US); Michael Schwall, Knoxville, TN (US)

(73) Assignee: SCHOTT AG, Mainz (DE)

( * ) Notice: Subject to any disclaimer, the term of this patent is extended or adjusted under 35 U.S.C. 154(b) by 231 days.

(21) Appl. No.: 17/814,977

(22) Filed: Jul. 26, 2022

(65) Prior Publication Data

US 2023/0035460 A1 Feb. 2, 2023

Related U.S. Application Data

(60) Division of application No. 16/881,690, filed on May 22, 2020, now Pat. No. 11,420,901, which is a
(Continued)

(30) Foreign Application Priority Data

Nov. 22, 2017 (DE) .................. 10 2017 127 624.6

(51) Int. Cl.
C03C 17/00 (2006.01)
C03C 3/078 (2006.01)
(Continued)

(52) U.S. Cl.
CPC ............ *C03C 17/007* (2013.01); *C03C 3/078* (2013.01); *C03C 3/083* (2013.01); *C03C 3/085* (2013.01);
(Continued)

(58) Field of Classification Search
CPC ............ C03C 2218/34; C03C 2218/32; C03C 2218/11; C03C 17/007; C03C 17/008
See application file for complete search history.

(56) References Cited

U.S. PATENT DOCUMENTS 5,898,180 A 4/1999 Venkataramani
6,111,229 A 8/2000 Schultheis
(Continued)

FOREIGN PATENT DOCUMENTS

CN 1288448 3/2001
CN 1442381 9/2003
(Continued)

OTHER PUBLICATIONS

International Search Report for corresponding International Application PCT/EP2018/082257 dated Mar. 6, 2019.
(Continued)

*Primary Examiner* — Kelly M Gambetta
(74) *Attorney, Agent, or Firm* — Ruggiero McAllister & McMahon LLC

(57) ABSTRACT

Coated glass or glass ceramic substrates having high temperature resistance, high strength, and a low coefficient of thermal expansion. The coating includes pores, is fluid-tight and suitable for coating a temperature-resistant, high-strength glass or glass ceramic substrate with a low coefficient of thermal expansion, and to a method for producing such a coated substrate.

22 Claims, 8 Drawing Sheets

Related U.S. Application Data continuation of application No. PCT/EP2018/082257, filed on Nov. 22, 2018.

(60) Provisional application No. 62/712,615, filed on Jul. 31, 2018.

(51) Int. Cl.

| | | |
|---|---|---|
| C03C 3/083 | (2006.01) | |
| C03C 3/085 | (2006.01) | |
| C03C 3/087 | (2006.01) | |
| C03C 3/089 | (2006.01) | |
| C03C 3/091 | (2006.01) | |
| C03C 3/093 | (2006.01) | |
| C03C 3/11 | (2006.01) | |
| C03C 3/112 | (2006.01) | |
| C03C 3/115 | (2006.01) | |
| C03C 3/118 | (2006.01) | |
| C03C 4/02 | (2006.01) | |
| C03C 8/02 | (2006.01) | |
| C03C 8/04 | (2006.01) | |
| C03C 8/06 | (2006.01) | |
| C03C 8/14 | (2006.01) | |
| C03C 10/00 | (2006.01) | |
| C03C 10/16 | (2006.01) | |
| F24C 15/04 | (2006.01) | |
| C03C 11/00 | (2006.01) | |

(52) U.S. Cl.
 CPC .............. *C03C 3/087* (2013.01); *C03C 3/089* (2013.01); *C03C 3/091* (2013.01); *C03C 3/093* (2013.01); *C03C 3/11* (2013.01); *C03C 3/112* (2013.01); *C03C 3/115* (2013.01); *C03C 3/118* (2013.01); *C03C 4/02* (2013.01); *C03C 8/02* (2013.01); *C03C 8/04* (2013.01); *C03C 8/06* (2013.01); *C03C 8/14* (2013.01); *C03C 10/0018* (2013.01); *C03C 10/0027* (2013.01); *C03C 10/0054* (2013.01); *C03C 10/16* (2013.01); *C03C 17/008* (2013.01); *F24C 15/04* (2013.01); *C03C 11/007* (2013.01); *C03C 2204/00* (2013.01); *C03C 2207/00* (2013.01); *C03C 2217/425* (2013.01); *C03C 2217/452* (2013.01); *C03C 2217/485* (2013.01); *C03C 2218/11* (2013.01); *C03C 2218/32* (2013.01); *C03C 2218/34* (2013.01)

(56) References Cited

U.S. PATENT DOCUMENTS

| 6,541,108 | B1 | 4/2003 | Hoffmann |
|---|---|---|---|
| 2003/0019864 | A1 | 1/2003 | Krause |
| 2003/0041623 | A1 | 3/2003 | Werdecker |
| 2005/0092318 | A1 | 5/2005 | Haustein |
| 2010/0028629 | A1 | 2/2010 | Anton |
| 2010/0047556 | A1 | 2/2010 | Bockmeyer |
| 2010/0115996 | A1 | 5/2010 | Werdecker |
| 2013/0221336 | A1 | 8/2013 | Allano |
| 2013/0266781 | A1* | 10/2013 | Hoffmann ............... F24C 15/10 427/269 |
| 2013/0273320 | A1 | 10/2013 | Bockmeyer |
| 2015/0024145 | A1 | 1/2015 | Bockmeyer |
| 2015/0037507 | A1 | 2/2015 | Bockmeyer |
| 2015/0315070 | A1 | 11/2015 | Benakli |
| 2015/0369492 | A1 | 12/2015 | Lecomte |
| 2017/0015600 | A1 | 1/2017 | Schaedler |
| 2017/0210660 | A1 | 7/2017 | Binhussain |
| 2017/0240459 | A1 | 8/2017 | Gioffreda |
| 2019/0152845 | A1 | 5/2019 | Rufino |

FOREIGN PATENT DOCUMENTS

| DE | 1029200 | 4/1958 |
|---|---|---|
| DE | 19746844 | 12/1998 |
| DE | 10129200 | 1/2003 |
| DE | 10014373 | 12/2003 |
| DE | 102007030698 | 1/2009 |
| DE | 102008031426 | 1/2010 |
| DE | 102008040636 | 1/2010 |
| DE | 102010031866 | 1/2012 |
| DE | 102011115379 | 4/2013 |
| DE | 202014010348 | 8/2015 |
| DE | 102015103461 | 9/2016 |
| EP | 1293726 | 3/2003 |
| EP | 1401781 | 3/2004 |
| EP | 1267593 | 3/2005 |
| EP | 2860226 | 4/2015 |
| WO | 0037362 | 6/2000 |
| WO | 02102734 | 12/2002 |
| WO | 2010081531 | 7/2010 |
| WO | 2012167932 | 12/2012 |
| WO | 2013156617 | 10/2013 |
| WO | 2017068368 | 4/2017 |
| WO | 2017216483 | 12/2017 |

OTHER PUBLICATIONS

English translation of International Preliminary Report on Patentability dated May 22, 2020 for corresponding International Application PCT/EP2018/082257, 9 pages.
ASTM G173, dated Jul. 9, 2020.
ISO 7884-8, dated Feb. 1998.
ISO 7991, dated Dec. 15, 1987.
DIN EN 1330-10, dated Mar. 2003, with English translation.
DIN 25435-2, dated Jan. 2014.
DIN EN 13018, dated Jun. 2016, with English translation.
ISO 13468-1, dated Jun. 2019.
ISO 13468-2, dated May 1, 1999.
ASTM D 1003-13, dated Nov. 2013.
EN ISO 11664-4, dated Jun. 2012.
DIN EN 473, dated Sep. 2008.
Gao et al., "Solar spectral optical properties of rutile TiO2 coated mica-titania pigments", 2014, Dyes and Pigments, 109, p. 90-95 (Year: 2014).
Shepherd, "Browm 10P895", 2014 (Year: 2014).

* cited by examiner

COATED GLASS OR GLASS CERAMIC SUBSTRATE, COATING COMPRISING CLOSED PORES, AND METHOD FOR COATING A SUBSTRATE

CROSS REFERENCE TO RELATED APPLICATIONS

This application is a division of U.S. application Ser. No. 16/881,690 filed May 22, 2020, which is a continuation of International Application PCT/EP2018/082257 filed Nov. 22, 2018, which claims benefit of both U.S. Application 62/712,615 filed Jul. 31, 2018 and German Application 10 2017 127 624.6 filed Nov. 22, 2017, the entire contents of all of which are incorporated by reference herein

BACKGROUND

1. Field of the Invention

The disclosure generally relates to coated glass or glass ceramic substrates, preferably those exhibiting high temperature resistance, high strength and a low coefficient of thermal expansion. Further aspects of the disclosure relate to a coating which includes pores and is fluid-tight and suitable for coating a glass or glass ceramic substrate, preferably a glass or glass ceramic substrate having a low coefficient of thermal expansion, and also relates to a method for coating such a substrate.

2. Description of Related Art

Coatings for glass or glass ceramic substrates, in particular glass or glass ceramic substrates having a low coefficient of thermal expansion, for example for low-expansion glasses from the family of silicate glasses or for glass ceramics, have been known for many years.

Such coatings pose particular challenges if the very good strength properties of these substrates are to be retained even after having been coated and at the same time a high temperature resistance of the coating is required. If, for example, decorative coatings are concerned which are used on glasses or glass ceramics that are exposed to high thermal loads during operation, then not only the thermal stability of visual appearance of these coatings and their adhesion to the substrate have to be ensured. Rather, other properties are also important in this case, for example scratch resistance, compatibility with adhesives, for example, which are used for the assembly of such glasses or glass ceramics, for example in holders, or for fastening components, and also the interaction of the coating in contact with fluids.

For example, it is known that underside coatings of transparent, non-volume-stained sheet-like glasses or glass ceramics that are used for cooktops, either have to be impermeable or require a second layer that is impermeable, i.e. tight against passage of fluids such as gases and liquids. Otherwise, that is in the case of open porosity, the fluids arising during use of a cooktop, such as condensed water, will penetrate. This will at least lead to visual alterations of the coating; however, depending on the type of fluid, this might also have a detrimental effect on the glass or glass ceramic.

However, these requirements are valid not only for underside coatings of cooktops, for example, but also for other applications such as viewing windows as used in furnaces, ovens, or fireplaces. Here too, fluid should be prevented from passing through the coating to the extent possible. For example, adhesive joints or the like should not be visible, and contaminations in the form of fluids arising during operation of an appliance or a device such as a cooking oven or a fireplace should be prevented from being visible through the coating. This not only has an aesthetic component, but also serves to protect the substrate material, which might be attacked by such fluids. Such a corrosive attack might, for example, reduce the strength of a coated substrate and thus result in reduced user safety.

Coatings for glasses or glass ceramics, in particular glasses or glass ceramics having a low coefficient of thermal expansion, have been known in the prior art.

For example, international patent application WO 2012/167932 A1 describes a purely inorganic layer which can be applied without cracks and which exhibits temperature resistance of up to 1000° C. However, the layer is porous.

International patent application WO 2013/156617 A1 describes a dense, non-porous layer composite, in which a first layer is applied so as to be porous, the pores so obtained are filled with a second material which is polymeric. Due to this organic filling of the pores, the coating is heat-resistant only to a limited extent and is in particular not suitable for use at high temperatures of >400° C.

International patent application WO 2010/081531 A1 relates to a porous sol-gel coating.

Also, German patent application DE 10 2008 031 426 A1, German patent application DE 10 2008 040 636 A1, and U.S. patent application US 2010/0047556 A1 only disclose porous layers based on sol-gel coatings.

The porosity of these layers is intentionally adjusted in order to compensate for the differences arising in terms of the thermal expansion coefficients of the layer and the substrate, namely in such a way that the heating and cooling of the layer composite during intended used thereof does not induce thermomechanical stresses to such a high extent that the coated glass or glass ceramic substrate would no longer have sufficient mechanical strength. This is particularly relevant in the case where the coating is disposed on the underside or rear face of the glass or glass ceramic substrate, that is to say on the side facing away from the user when in operation. In such a case, the mechanical loading occurs from above or from the front, so that any cracks existent on the underside or rear face would have a very severe effect on the impact and bending resistance of the glass or the glass ceramic, for example even to such an extent that specifications regarding minimum strength could no longer be met.

Porous coatings for glasses or glass ceramics are furthermore known from German patent DE 100 14 373 C2 and from European patent EP 1 267 593 B1.

However, as mentioned above, difficulties arise with such porous coatings when fluids come into contact with these coatings, besides water and oil also food or adhesives, for example. For sealing the pores, it is moreover known to apply a silicone-based sealant, for example, as described in U.S. patent application US 2013/0266781 A1.

However, there are always two problems arising with such sealing:

On the one hand, such a sealing is usually not sufficiently temperature resistant for use at very high temperatures of, e.g., >400° C.

By sealing the pores, the positive effect of mitigating thermal stresses caused by the different thermal expansion coefficients of the layer and the substrate is eliminated. Consequently, in the event of very strong heating, not only will the sealing fail in terms of its sealing effect, but, moreover, strength will be significantly reduced, for example due to crack formation.

Therefore, the prior art coatings are only useful for applications in which maximum exposure temperature does not exceed 400° C.

There is therefore a need for providing liquid-tight coatings for glass or glass ceramic substrates, in particular for substrates having a low coefficient of thermal expansion.

SUMMARY

A general object of the invention is to mitigate the known deficiencies of coated glass or glass ceramic substrates, in particular with regard to tightness and temperature stability of the coating.

Hitherto, no economically producible decorative coatings with matched thermal expansion coefficients have been available for glass ceramics and glasses having a low coefficient of thermal expansion. In particular in the case of full-surface coatings or dense decorations, a reduction in bending tensile strength arises as a serious drawback. It is possible to avoid this problem of reducing bending tensile strength by a very slight, that is to say very thin coating, but full-surface layers for achieving protection or optically more dense decorations as a design version will not be possible in this way.

The object of the invention relates in particular to the providing of glass or glass ceramic substrates which preferably have a low coefficient of thermal expansion, and which substrates comprise a coating.

Another aspect of the disclosure relates to the providing of coatings that include pores and are self-sealing by design.

Yet another aspect of the disclosure encompasses a method for coating a glass or glass ceramic substrate with such a layer.

The glass or glass ceramic substrate of the present disclosure is provided with a coating that includes closed pores, and the coating is effective as a barrier against the passage of fluids such as water or water vapor.

The present disclosure accordingly provides a glass or glass ceramic substrate with a coating that includes closed pores, and the coating is designed as a barrier against ingress and passage of fluids and has a barrier effect.

In this way, fluids which come into contact with the coated substrate during intended use thereof, for example, will not be disruptively noticeable in the coating itself. In particular, the fluid is prevented from penetrating into the coating, so that the latter is virtually "water-resistant". In the sense of the disclosure, a coating is therefore referred to as being water-resistant or $H_2O$-resistant if no water vapor can penetrate through the layer.

This is particularly advantageous for full-surface coatings, since coatings according to the present disclosure may be disposed in the form of an underside or backside coating, for example so as to face the interior of an oven, and thus on the side of the glass or glass ceramic substrate facing away from the user during intended use thereof. In such cases, when viewed from outside, that is to say from the side of the glass or glass ceramic substrate opposite the coating, no condensed water or shadow of condensed water will be visible.

However, it is generally also possible and may even be preferred that the coating according to the present disclosure is applied so as to not cover the entire surface, but instead only with a covering percentage of 40% or more, for example, such as in the case of frame printing on fireplace windows or for oven windows.

If the substrate is in the form of a transparent, non-volume-stained substrate, the barrier effect of the coating can be determined by a test, for example, in which a drop of a fluid medium such as water is applied to the coating and allowed to act for at least 10 seconds and is then wiped off, and the test is passed if the area of action of the drop is not discernable as such when the coating is viewed through the substrate.

Such test procedures are generally known under the term visual inspection and are based on the relevant standards, such as DIN EN 1330-10, DIN 25435-2, and DIN EN 13018. In the present case, direct or indirect visual inspection by an inspecting person is preferred. In the case of direct visual inspection, the inspection is performed with a non-interrupted beam path between the eye of the inspecting person and the surface to be tested, whereas in the case of an indirect visual inspection, the beam path is interrupted by capturing the surface to be tested by suitable photo or video equipment. Furthermore, local visual inspection in compliance with DIN EN 13018 is preferred, which defines minimum illuminance, a distance to the surface to be tested, and a viewing angle of the inspecting person.

The minimum illuminance employed for the inspection is at least 500 lx on the test surface from a distance of less than 600 mm. The viewing angle of the examiner is at least 30°. The examiner preferably satisfies the requirements set out in the relevant standards, such as DIN EN 13018 and EN 473.

Such a test procedure is particularly preferred because it can be easily adapted to the respective fields of application of the coated glass or glass ceramic substrates. For example, the duration of exposure time is usually chosen as a function of the considered fluid medium and can also be more than 10 seconds.

For the purposes of the present disclosure, fluids preferably include liquids, in particular water, aqueous liquids, alcohols, liquids based on these liquids or liquids comprising these liquids, such as glass cleaning agents, and/or oils, and water vapor.

A preferred procedure for carrying out a visual inspection by an inspecting person as explained above with the aim of determining water-tightness or moisture-tightness of a coating according to the present disclosure comprises the steps of: applying a liquid onto a surface area of the coating of the substrate; allowing the liquid to act for a duration of 15 seconds; wiping off residual moisture of the liquid using a dry cloth; turning over the substrate so that the coating is disposed on the side of the substrate facing away from the inspecting person; and verifying, by visual inspection, whether a color change is recognizable in the area or in an area adjacent to the area, wherein a) the visual inspection is performed under daylight according to standard illuminant D65 or under lighting of an incandescent lamp, compact fluorescent lamp, fluorescent lamp, or light-emitting diode;
b) illuminance is at least 500 lx at a distance of less than 600 mm from the coating, i.e. from the inspected area; and
c) the viewing angle of the inspecting person is between 5° and 90°, preferably at least 30°, wherein when the coating is viewed through the substrate, the area of action of the drop is not disruptively noticeable and in particular not discernable as such.

The visual inspection mentioned above comprises in particular the examination as to whether a water mark and/or a water stain is visible from the side of the substrate opposite the coated side.

The above-mentioned steps of visual inspection are preferably performed using different liquids, i.e. fluids including water, alcohol, and/or glass cleaning agent (e.g. "Sidolin" or "Ajax").

The glass or glass ceramic substrate preferably has a low coefficient of thermal expansion, preferably a coefficient of thermal expansion of less than $5*10^{-6}$/K in the temperature range from 20° C. to 700° C.

In the context of the present disclosure, coefficient of thermal expansion refers to the nominal coefficient of mean linear thermal expansion according to ISO 7991, which is determined in static measurement.

According to a further embodiment of the disclosure, the coating is a high temperature resistant, self-sealing coating.

In the present disclosure, a coating is referred to as self-sealing if no further coating is necessary in order to prevent sufficient tightness against the ingress or passage of fluids. Hence, the layer exhibits a barrier effect against fluids. The coating with pores according to embodiments of the present disclosure is thus designed to be self-sealing, for example as a barrier against the passage of fluids.

Furthermore, a high temperature resistant coating is distinguished by the fact that when applied on a cooktop, it will not exhibit any change in color, adhesion to the substrate, or transmittance after cooling in comparison to before having been heated in the case of the normal intended heating of the cooktop by IR radiation or induction heating.

In the context of the present disclosure, a coating is therefore in particular considered to be high temperature resistant if after a thermal load, for example a load for verifying suitability for IR radiant heaters or suitability for induction as explained above, there are no significant deviations, in a range of measurement accuracy, between the state before the thermal load and the state after the thermal load, for example in terms of transmittance, in particular in $\tau_{vis}$ (in-line transmittance) in the wavelength range of visible light (from a wavelength of approximately 380 nm to less than or equal to 700 nm), in strength, in particular as determined through the ball drop test value, and/or in the barrier effect against passage of fluids.

In the context of the present disclosure, the terms layer and coating are used synonymously in the sense that, unless expressly stated otherwise, a layer as well as a coating are considered to be a material layer obtained by application of a coating material such as a printing ink onto a substrate, that is to say both a layer and a coating constitute a material layer obtained by a coating technique.

In the context of the present disclosure, a substrate is understood to mean an article having a surface that has been or is to be refined. In particular, a substrate is understood to mean an article whose surface is to be coated or is coated.

In the context of the present disclosure, the substrate is generally thicker than the layer or coating applied onto the substrate. As a rule, it can be assumed that the layer has a thickness of not more than 500 μm. A substrate, by contrast, will have a thickness of 1 mm or more.

A substrate is understood to be sheet-like if its spatial extent in one spatial direction of a Cartesian coordinate system is at least one order of magnitude smaller than in the other two spatial directions perpendicular to this spatial direction. In this case, the smallest lateral dimension of an article such as a substrate is usually referred to as thickness thereof, and the other two lateral dimensions are usually referred to as length and width. The lateral dimensions of an article such as a substrate are determined by the surfaces delimiting the article. If an article such as a substrate is sheet-like, it generally has two main surfaces which lie perpendicular to the thickness of the article such as the substrate. Depending on the precise spatial arrangement, these main surfaces are referred to as the upper side (facing the viewer) and as the lower side (the side of the article, e.g. the substrate, facing away from the viewer) in the case of a horizontal orientation of the article, e.g. the substrate, and on the other hand, in the case of a vertical orientation of the article, e.g. the substrate, usually as a front side (facing a viewer or user) and as a rear side (facing away from a viewer or user). For the purposes of the present disclosure, a substrate may be in the form of a flat or curved sheet, for example.

A pigment is generally understood to mean a colorant, that is to say a color-imparting substance. In contrast to dyes, pigments consist of particles and are therefore virtually insoluble in the application medium. Pigments can be differentiated according to their chemical structure (inorganic or organic), their optical properties (white, colored, black, effects), and their technical properties (corrosion protection, magnetism). The color appearance arises due to absorption and remission (scattering or reflection) of certain frequency components of visible light. What is furthermore decisive for the properties of the pigments are solid matter properties such as crystal structure, crystal modification, particle size, and particle size distribution, the latter due to the specific surface area.

Furthermore, pigments are known which are used to produce a certain visual effect, in particular a metallic appearance. Such pigments are also referred to as effect pigments. Effect pigments include for instance platelets or flakes made of metal, mica, or glass, or another inorganic, usually transparent material, for example $SiO_2$ or $Al_2O_3$. A specific configuration of the coating of such transparent platelets may not only cause a particular reflection, but may also cause color effects as a result of interference effects. In this case, coating materials for producing particular effects may comprise $SiO_2$ and $TiO_2$. Where appropriate, absorbing materials are used for coatings, for example oxides comprising iron.

One example of such effect pigments are the mica-based effect pigments known under the Iriodin® brand.

In the context of the present disclosure, a suspension is understood to mean a slurry of a solid component in a liquid. By way of example, the term 'suspension' in particular encompasses slips, a slip essentially consisting of a slurry of substantially, i.e. at least 95 wt % based on the solids content, of inorganic material in a liquid. The liquid itself may be aqueous, but may also be organic, for example comprising an organic solvent. Such slips usually have a solids content of between 40 wt % and 80 wt %, based on the total weight of the slip.

For the purposes of the present disclosure, the term suspension moreover encompasses for instance printing inks or printing pastes which have a pasting ratio (powder-to-medium) from 10:12 to 10:2.5 and viscosities (determined using a plate viscometer) which are between 2000 and 10,000 mPa·s at a rotation speed of 200 per second.

$T_g$ is the glass transformation or transition temperature of a glass. The transition temperature $T_g$ is determined by the intersection point of the tangents to the two branches of the expansion curve when measuring at a heating rate of 5 K/min. This corresponds to a measurement in compliance with ISO 7884-8 or DIN 52324.

By way of example, the coating of the present disclosure may comprise a glaze or an enamel. What is usually referred to as a glaze includes coating compositions consisting of a clear or dyed glass, also known as glass flux. Enamels are coating compositions which, in addition to a glass flux, furthermore include materials such as color and/or effect pigments.

Glazes and enamels have also been known for a long time. They are fired at temperatures usually below the softening temperature of the substrate to be coated, in order to avoid deformations during firing, while the respective glass flux composition melts and is durably bonded to the surface of the substrate to be coated. The firing also serves to volatilize the employed organic additives which are used, for example, as suspension agents for the application of the coating composition.

For coating glass or glass ceramic substrates which have a coefficient of thermal expansion of $5*10^{-6}$/K or more, it is possible to find glazes or enamels with matched thermal expansion coefficients. However, this is not possible for substrates which have a low coefficient of thermal expansion. In order to avoid a critical reduction in strength of the substrate, the coating of the present disclosure is therefore designed so as to include pores. For this purpose, the suspension of the present disclosure comprises, in addition to the glass powder, an agent which decomposes upon temperature increase to form a volatile substance. Therefore, by way of example, the coating with closed pores according to the present disclosure may be in the form of a foamed enamel according to one embodiment.

According to a further embodiment of the disclosure, the substrate is a sheet-like substrate, and the substrate has a thickness between at least 1 mm and at most 10 mm, preferably between at least 2 mm and at most 5 mm, and most preferably between at least 2 mm and at most 4 mm.

According to a further embodiment, the coating including closed pores is disposed on the side of the substrate facing away from the user during intended use. Such a coating may in particular be disposed on the rear side of a viewing window, such as a viewing window of a cooking oven door, or a fireplace viewing window or an oven viewing window.

The coating is preferably applied in a laterally patterned form so that at least one portion of the glass or glass ceramic substrate remains free of the coating. For example, this is advantageous if electro-optical indicating components such as displays are provided on the substrate.

The inventors assume that the coating including the closed pores according to the present disclosure exhibits some IR reflectivity so as to cause a reduction in temperature on one side, in particular the non-coated front side of a viewing window (the side facing away from the interior of the cooking oven in the case of a cooking oven door, or the side facing away from the fireplace, in the case of a fireplace), for example of a cooking oven viewing window, or of the viewing window of a fireplace or an oven, as compared to a coating which has no pores or only very few pores, especially no or very few closed pores.

According to a further embodiment of the disclosure, the coating comprises colorants and/or effect agents, in particular a color pigment and/or an effect pigment, preferably an IR-reflecting color pigment.

For example, pigments that may be added in particular include color-imparting pigments in the form of metal oxides, in particular metal oxides having a spinel structure, such as cobalt containing pigments, in particular cobalt-aluminum oxide/spinel, cobalt-aluminum-zinc oxide/spinel, cobalt-aluminum-silicon oxide/spinel, cobalt-titanium oxide/spinel, cobalt-chromium oxide/spinel, cobalt-aluminum-chromium oxide/spinel, cobalt-nickel-manganese-iron-chromium oxide/spinel, cobalt-nickel-zinc-titanium-aluminum oxide/spinel, chromium-iron-nickel-manganese oxide/spinel, cobalt-iron-chromium oxide/spinel, nickel-iron-chromium oxide/spinel, iron-manganese oxide/spinel, copper-chromium spinel, zirconium-silicon-iron oxide/spinel, as well as further oxides, for example iron oxides, iron-chromium oxides, iron-chromium-tin-titanium oxides, nickel-chromium-antimony-titanium oxide or titanium oxide. Mixtures of these pigments are of course also possible, in particular in order to achieve special color impressions. Graphite may also be used as a pigment.

According to one embodiment of the disclosure, the coating may contain an IR-reflecting color pigment. Here, IR-reflecting color pigment is understood to mean in particular a color pigment which exhibits a remission of at least 50% at a wavelength of 1500 nm. Due to the high remission of infrared (IR) radiation, a large part of the heat radiation is remitted. Remission was determined in compliance with the ISO 13468 measurement standard, here.

Furthermore in this embodiment, the pigment has a TSR value of at least 20%. The TSR (total solar reflectance) value provides information about the percentage of reflected electromagnetic radiation in the wavelength range from 200 nm to 2500 nm and is determined in compliance with the ASTM G 173 measurement standards.

It has been found here, that a high TSR value of the pigments also has an impact on the remission behavior of a coating produced from the paste with regard to the longer wavelengths thermal radiation. Here, a high TSR value is advantageous for achieving high remission of thermal radiation, i.e. of electromagnetic radiation in a range from 1 to 4 µm. This is surprising, since the wavelength ranges of thermal radiation and the wavelength range which is relevant for the determination of the TSR value only partially overlap. In particular, the TSR value as the transmittance value for solar radiation relates to the wavelength range from 200 nm to 1000 nm and thus to substantially shorter wavelengths.

According to one embodiment, the paste comprises at least one IR-reflecting pigment with a TSR value of at least 25%. Alternatively or additionally, the pigment exhibits a remission of at least 60% or even at least 70% at a wavelength of 1500 nm, as measured according to ISO 13468.

One embodiment contemplates that the particles of the IR-reflecting pigment have a size distribution with a d50 value in the range from 0.5 µm to 2 µm. The small particle size allows the paste to be applied even with close-meshed screens, for example with screens having a thread count of 77 threads per cm or even 100 threads per cm, so that the paste can be used to produce coatings or decorations with high graphic resolution by screen printing. Furthermore, the layer thickness of the coating after firing is determined by the mesh size of the employed screen along with the oil content and powder densities. According to a preferred embodiment, the IR-reflecting pigments have a particle size distribution with a d50 value in the range from 0.8 µm to 1.8 µm. According to one embodiment, the IR-reflecting pigments include particles with a specific surface area in a range from 1.1 to 8 $m^2$/g, preferably in a range from 1.8 to 4.5 $m^2$/g.

The table below lists some of the screens used for screen printing.

| Screen designation in the text | Number of threads ($cm^{-1}$) | Thread diameter, nominal (µm) | Mesh size (µm) |
| --- | --- | --- | --- |
| 77T | 77 | 55 | 67 |
| 90T | 90 | 48 | 55 |
| 100T | 100 | 40 | 37 |

The pigment containing coating is intended to reflect or remit radiation to the best extent possible in order to provide for a coated substrate in which the glass or glass ceramic, respectively, is heated to the lowest extent possible. Within the scope of the present disclosure, reflection and remission is in contrast intended to be as high as possible in a wavelength range that corresponds to a temperature of approximately 150° C. to at most 500° C.

The emitted power at different wavelengths is assumed to be in the form of blackbody radiation, in which case the emitted spectrum is defined by specifying the temperature. Consequently, the presently disclosed temperatures can be associated with corresponding spectra of blackbody radiators with high accuracy.

Such a design of a glass or glass ceramic substrate with a coating allows to control the reflection of heat radiation in this way. This is particularly advantageous if the glass or glass ceramic substrate is in the form of a viewing window for an oven, such as a cooking oven, for example, or a fireplace viewing window, or in the form of a viewing window for another combustion chamber. A design of the coating so as to include an IR-reflecting color pigment makes it possible to increase the reflection of heat radiation, i.e. IR radiation, into the oven chamber, for example into a cooking oven, or into a fireplace or into a combustion chamber. In this way it is possible, for example, to make combustion processes more efficient, and it is possible to reduce the energy consumption of, for example, a cooking oven, since less heat radiation will be dissipated to the outside through the pane. Such a configuration allows to achieve a further reduction in the temperature on the front side of a coated glass or glass ceramic substrate.

It has been shown that in particular chromium containing color pigments such as a chromium containing iron oxide, a chromium containing hematite, and/or a chromium-iron-nickel spinel, and/or a cobalt-chromite spinel, and/or indium-manganese-yttrium oxide, and/or niobium-sulfur-tin oxide, and/or tin-zinc titanate, and/or cobalt titanate spinel have such IR-reflecting properties. IR-reflecting color pigments with a black or black-brown color are preferably used.

The respective pigments in particular exhibit high thermal stability and high chemical inertness with respect to the glass components of the glass powder in the paste, which is particularly advantageous in view of the firing of the paste for producing the corresponding enamel coating. Thus, according to one embodiment, the maximum possible firing temperature is not limited by the stability of the pigments. In a refinement of the invention, this allows the paste on a glass or glass ceramic substrate to be fired at high temperatures in the range from 500 to 1000° C., so that the glass substrate can be thermally toughed during the firing process of the layer.

The use of chromium containing color pigments as an IR-reflecting color pigment has been found to be particularly advantageous. The IR-reflecting color pigment included in the coating preferably comprises a chromium containing iron oxide, a chromium containing hematite, and/or a chromium-iron-nickel spinel. These color pigments have proven to be advantageous with regard to their spectral properties, in particular with regard to remission in the IR range, and with regard to their heat resistance. The heat resistance of these color pigments is not only relevant for the use of the coated substrate, for example in a cooking oven door or in a fireplace window, but also for the fabrication process of the respective coating, which involves firing at temperatures in a range from 500° C. to 1000° C.

The IR-reflecting color pigment preferably has a black or black-brown color. In particular, the IR-reflecting color pigment is selected from the group comprising the pigments CI Brown 29, CI Green 17, and Black CI 7.

According to one exemplary embodiment of the invention, the glass powder contained in the paste has a particle size distribution with a d50 value in a range from 0.1 μm and 3 μm and in particular in a range between 0.1 μm and 2 μm. Such particle sizes ensure a homogeneous distribution of the pigments and the formation of a largely homogeneous glass layer during the firing process.

The glass in the paste preferably contains zinc oxide and/or bismuth oxide. Glass powders which have a zinc oxide content in a range from 0.1 to 70 wt % and in particular a zinc oxide content in a range from 0.1 to 30 wt % have proven to be particularly advantageous. Alternatively or additionally, the glass powder contains 0.1 to 70 wt % and in particular 8 to 70 wt % of bismuth oxide. The amount of zinc oxide or bismuth oxide in the embodiments described above has a particularly advantageous impact on the softening temperature of the glass. According to a refinement of these embodiments, the glass powders have softening temperatures in a range from 500 to 950° C. The softening temperature is preferably less than 800° C. or even less than 750° C., and most preferably less than 680° C., but more than 450° C. Due to the low softening temperatures, a homogeneous glass matrix or glass flux is obtained from the glass powder even at low firing temperatures. This allows glass substrates of different glass compositions (and thus different softening temperatures) to be coated with the paste without reducing the viscosity of the glass substrate to be coated during the firing.

Moreover, the content of bismuth oxide in the glass increases the chemical resistance of the respective coating made of the paste.

Since in some embodiments or further refinements the glass matrix or glass flux in the coating of the coated substrate has the same composition as the glass powder in the paste, the specifications regarding the composition of the glass powder also apply accordingly to the composition of the glass matrix in the coating.

According to one embodiment of this refinement, the glass powder in the paste or the glass matrix of the corresponding coating has the following composition, in wt %:

| | |
|---|---|
| $SiO_2$ | 30-75, preferably 44-75 |
| $Al_2O_3$ | 0-25, preferably 0.2-25, more preferably 2-25 |
| $B_2O_3$ | 0-30, preferably 1-30, more preferably 5-30 |
| $Li_2O$ | 0-12 |
| $Na_2O$ | 0-25, preferably 0-15 |
| CaO | 0-12 |
| MgO | 0-9 |
| BaO | 0-27 |
| SrO | 0-4 |
| ZnO | 0-35, preferably 0-20 |
| $Bi_2O_3$ | 0-5 |
| $TiO_2$ | 0-10, preferably 0-5 |
| $ZrO_2$ | 0-7 |
| $As_2O_3$ | 0-1 |
| $Sb_2O_3$ | 0-1.5 |
| F | 0-3 |
| Cl | 0-1, preferably 0 |
| $H_2O$ | 0-3. |

The glass preferably has a minimum $Al_2O_3$ content of 0.2 wt %, more preferably of at least 2 wt %. Alternatively or additionally, the glass has a $B_2O_3$ content of at least 1 wt %, preferably at least 5 wt %.

It was moreover found to be advantageous if the glass contains at least 1 wt % of an alkali oxide selected from the group consisting of $Na_2O$, $Li_2O$, and $K_2O$, or mixtures of these oxides.

Alternatively or additionally, the glass comprises at least 1 wt % of a further oxide or a mixture of oxides selected from the group consisting of CaO, MgO, BaO, SrO, ZnO, $ZrO_2$, and $TiO_2$.

According to another embodiment, the glass has the following composition, in wt %:

| | |
|---|---|
| $SiO_2$ | 6-65, preferably 10-65, more preferably 15-65 |
| $Al_2O_3$ | 0-20 |
| $B_2O_3$ | 0-40, preferably 1-30, more preferably 3-30 |
| $Li_2O$ | 0-12 |
| $Na_2O$ | 0-18 |
| $K_2O$ | 0-17 |
| CaO | 0-17 |
| MgO | 0-12 |
| BaO | 0-38 |
| SrO | 0-16 |
| ZnO | 0-70 |
| $TiO_2$ | 0-5 |
| $ZrO_2$ | 0-5 |
| $Bi_2O_3$ | 0-75, preferably 0-60, more preferably 5-60, most preferably 10-60 |
| CoO | 0-5 |
| $Fe_2O_3$ | 0-5 |
| MnO | 0-10 |
| $CeO_2$ | 0-3 |
| F | 0-3 |
| Cl | 0-1 |
| $H_2O$ | 0-3. |

In a preferred embodiment of the refinement, the glass has a minimum $SiO_2$ content of 10 wt %, preferably at least 15 wt %. Alternatively or additionally, the glass has a minimum $Bi_2O_3$ content of 5 wt %, preferably at least 10 wt %. Alternatively or additionally, the glass contains at least 1 wt %, preferably at least 3 wt % of $B_2O_3$. The total content of the alkali oxides $Na_2O$, $Li_2O$, and $K_2O$ is preferably at least 1 wt %.

The glass or glass flux contained in the paste of the respective coating may in particular be an alkali-free glass, an alkali-containing glass, a silicate glass, a borosilicate glass, a zinc silicate glass, a zinc borate glass, a zinc borosilicate glass, a bismuth borosilicate glass, a bismuth borate glass, a bismuth silicate glass, a phosphate glass, a zinc phosphate glass, an aluminosilicate glass, or a lithium aluminosilicate glass. According to one embodiment of the invention, the paste comprises glass powders of different glass compositions.

According to one embodiment of this refinement, the coating exhibits a remission of at least 35% at a wavelength of 1500 nm, measured in compliance with the ISO 134 68 measurement standard.

It has been found in this case that a high TSR value of the pigments in the coating also has an impact on the remission behavior of the produced coating with regard to heat radiation. Here, a high TSR value has proven to be advantageous for the remission of heat radiation in a temperature range from 200 to 475° C. This is surprising, since the corresponding wavelength for the temperature range stated above has its maximum in a range from 1 µm to 4 µm, whereas the TSR value relates to the solar spectrum with significantly shorter wavelengths in a range from 200 nm to 1000 nm. According to a preferred embodiment, the pigment has a TSR value of at least 25%.

The pigments are homogeneously distributed in the glass matrix, also referred to as glass flux below. According to one embodiment, the pigments have a particle size distribution with a d50 value in a range from 0.5 µm to 2 µm, preferably in a range from 0.8 µm to 1.8 µm. According to this embodiment, the pigments therefore have a particle size smaller than the wavelength of the thermal radiation to be reflected. Surprisingly, the layer nevertheless exhibits high remission for radiation in the IR range. For example, at a wavelength of 1500 nm the layers according to the invention exhibit a remission of at least 35%. According to a preferred embodiment, remission is at least 40% or even at least 45% at 1500 nm.

In yet another embodiment, the coating includes at least a first pigment and an IR-reflecting color pigment. The second, IR-reflecting color pigment in particular allows to adjust the color coordinates of the coating. The second, IR-reflecting color pigment in the coating preferably is one of a cobalt chromite spinel, an indium-manganese-yttrium oxide, a niobium-sulfur-tin oxide, a tin-zinc titanate, and/or a cobalt titanate spinel. What has proven to be particularly advantageous is the use of one of the color pigments from the group comprising C.I. Pigment Blue 36, C.I. Pigment Blue 86, C.I. Pigment Yellow 227, C.I. Pigment Yellow 216, C.I. Pigment Green 26, and C.I. Pigment Green 50. The amount of the second, IR-reflecting pigment in the coating is preferably from 0.75 to 18.5 wt %, most preferably 4.5 and 14 wt %. According to one embodiment, a volume ratio between the volume of the second pigment and the volume of the first pigment is 0.03 to 0.6, preferably 0.05 to 0.56, and most preferably 0.14 to 0.47.

Such a configuration allows not only to further reduce the temperature on the front side of a coated glass or glass ceramic substrate through the second IR-reflecting pigment, but also to adjust the color coordinates of the coating.

What is preferably used as the effect pigments are platelet-shaped or rod-shaped pigments, for example based on mica or Iriodin®.

The substrate advantageously comprises an oxidic glass or an oxidic glass ceramic, preferably a silicate glass or a silicate glass ceramic, most preferably a lithium aluminum silicate glass ceramic.

According to a further embodiment, the substrate comprises a soda-lime glass or a borosilicate glass. The glass is preferably thermally toughened to increase its strength.

The coating may also comprise organic substances. Usually, these are residues of organic compounds that have been added to the suspension, for example in the form of solvents, and have not completely been decomposed. Also, these may be residues of organically based blowing agents that have not completely been decomposed. According to one embodiment, the coating is substantially inorganic. Here, substantially inorganic means that the coating comprises at least 95 wt % of inorganic constituents, preferably at least 98 wt % of inorganic constituents, and more preferably at least 99 wt % of inorganic constituents. Most preferably, the percentage of inorganic constituents in the coating is 99.9 wt % or more.

According to a further embodiment of the disclosure, the coefficients of thermal expansion of the substrate and of the coating are matched to one another so that the resulting coefficient of thermal expansion of the coating and the coefficient of thermal expansion of the substrate do not differ from one another by more than $4*10^{-6}$/K in the temperature range from 20° C. to 700° C.

Here, the resulting coefficient of thermal expansion of the coating is referred to, since the coating usually an inhomogeneous material which comprises materials with different expansion coefficients, in particular a glass flux and pores and optionally a pigment and/or other constituents. So, what has not to be considered in this respect is the resulting coefficient of thermal expansion, which results from the structure comprising the pores and the thermal expansion coefficients of the individual constituents of the coating.

According to one embodiment of the disclosure, the resulting coefficient of thermal expansion of the coating has a value between at most $9*10^{-6}$/K and at least $3*10^{-6}$/K.

By way of example, the glass ceramic may be provided in the form of a transparent non-volume-stained glass ceramic. For example, the glass ceramic may have a composition selected from one of the following composition ranges, in wt %:

| Element | Glass ceramic composition | |
|---|---|---|
| oxide | Range 1 | Range 2 |
| $SiO_2$ | 66-70 | 50-80 |
| $Al_2O_3$ | >19.8-23 | 12-30 |
| $Li_2O$ | 3-4 | 1-6 |
| MgO | 0-1.5 | 0-5 |
| ZnO | 1-2.2 | 0-5 |
| BaO | 0-2.5 | 0-8 |
| $Na_2O$ | 0-1 | 0-5 |
| $K_2O$ | 0-0.6 | 0-5 |
| $TiO_2$ | 2-3 | 0-8 |
| $ZrO_2$ | 0.5-2 | 0-7 |
| $P_2O_5$ | 0-1 | 0-7 |
| $Sb_2O_3$ | usual amounts | 0-4 |
| $As_2O_3$ | usual amounts | 0-2 |
| CaO | 0-0.5 | 0 |
| SrO | 0-1 | 0 |

Furthermore, by way of example, glass ceramics marketed under the name CERAN® may also be used, such as CERAN® Cleartrans or Zerodur.

By way of example, the glass substrate may have a composition from one of the following composition ranges, in wt %:

| Element | Glass substrate composition (wt %) | | | |
|---|---|---|---|---|
| oxide | Range 1 | Range 2 | Range 3 | Range 4 |
| $SiO_2$ | 60-80 | 60-85 | 40-55 | 65-80 |
| $Al_2O_3$ | <2 | 5-15 | 15-30 | 0-5 |
| $Li_2O$ | 0-5 | 0-5 | 0-5 | 0-20 |
| MgO | 0-5 | 0-5 | 2-10 | 0-15 |
| ZnO | 0-10 | 0-5 | 0-5 | 0-5 |
| BaO | 0-5 | 0-5 | 0-5 | 0-5 |
| $Na_2O$ | 10-20 | 2.5-12.5 | 2.5-12.5 | 0-20 |
| $K_2O$ | 5-15 | 0-5 | 0-5 | 0-20 |
| $B_2O_3$ | 0-3 | 12-25 | 12-25 | 0-5 |
| $P_2O_5$ | 0-1 | 0-2.5 | 0-2.5 | 0-1 |
| CaO | 5-15 | 0-1 | 5-15 | 0-15 |
| SrO | 0-1 | 0-1 | 0-1 | 0-1 |
| $Sb_2O_3$ | usual amounts | usual amounts | usual amounts | usual amounts |
| $As_2O_3$ | usual amounts | usual amounts | usual amounts | usual amounts |

Furthermore, by way of example, substrates based on soda-lime glass, aluminosilicate glass, or borosilicate glass may also be used. To increase strength, the glass is preferably thermally or chemically toughened.

According to one embodiment of the disclosure, the coating has a thickness between at least 0.1 µm and at most 500 µm, preferably between at least 1 µm and at most 100 µm, most preferably between at least 1.5 µm and at most 20 µm.

According to a further embodiment of the disclosure, the substrate is configured so that the coating is designed to be essentially non-transmissive to electromagnetic radiation in the wavelength range from 380 nm to 780 nm, in particular so that components arranged beneath the substrate will not be visible during intended use thereof.

The coating is substantially non-transmissive, which is also referred to as 'opaque', when $\tau_{vis}$ (in-line transmittance) assumes a value of less than 10% in the wavelength range of visible light (from a wavelength of approximately 380 nm to less than or equal to 700 nm).

Another aspect of the present disclosure relates to a method which can be used for coating a glass or glass ceramic substrate, preferably a substrate having a low coefficient of thermal expansion, preferably a coefficient of thermal expansion of less than $5*10^{-6}$/K in the temperature range from 20° C. up to 700° C. The applied coating is designed so as to include pores, so that a coating is provided which is designed as a barrier against the passage of fluids.

The method comprises the steps of:

(a) Preparing a suspension. The suspension comprises a glass powder and an agent that decomposes upon temperature increase to form a volatile substance.

By way of example, this includes agents which release gas. The agents are preferably configured such that their anions form gas within the temperature range of the viscous melt of the glass flux and the cations of the agent are incorporated into the glass matrix without impairing the desired properties. Such agents are also referred to as blowing agents or foaming agents.

Particularly considered as the blowing agents are agents which comprise carbides, carbonates, or hydrogen carbonates and manganese compounds. Substances which are in the form of hydroxides and/or comprise water of crystallization may also be used as blowing agents. For example, this includes salts, clay minerals, borates, or aluminates. Phosphates or sulfates may also be considered as blowing agents. The exemplary blowing agents mentioned can be used alone or in mixtures.

Organic substances may also be used as blowing agents, in addition to the inorganic substances mentioned. For example, this includes substances which at the temperatures considered here decompose while forming gas, in particular tartrates such as potassium hydrogen carbonate, but also sugar, wood dust, wheat flour, or starch.

Certain oxides also decompose while releasing a gas, for example cerium(IV) oxide or manganese(IV) oxide.

More generally, blowing or foaming agents are understood to mean agents which decompose upon temperature rise to form at least one substance which is volatile at the decomposition temperature of the blowing agent. Volatile substance in particular refers to a gas. However, it should be noted here that it is possible that the volatile substance produced at the decomposition temperature may have a different state of aggregation after the coated substrate has cooled to room temperature. If, for example, water vapor is formed as a volatile substance from a blowing agent at the decomposition temperature, it is possible that after cooling of the coated substrate there will no longer be water vapor in the pore, but liquid water.

Since, according to the present disclosure, the pores created by the decomposition of a blowing agent are in the form of closed pores, it is assumed that the substance that is volatile at the decomposition temperature may be at least partially included in the pores of the coating. However, this does not necessarily have to be in a volatile form. For example, it is also possible for the substance that is volatile at the decomposition temperature to be in the form of a condensate at room temperature.

An exemplary list of suitable blowing agents that can be used alone or in combination can be found in the table below.

| Substance group | Examples | |
|---|---|---|
| | Trivial name | Formula |
| Sulfates | plaster | $CaSO_4*2H_2O$ |
| | anhydrite, | $CaSO_4$ |
| | cerium(IV) sulfate hydrate | $Ce(SO_4)_2*2H_2O$ |
| Carbonates | potash | $K_2CO_3$ |
| | limestone | $CaCO_3$ |
| | magnesite | $MgCO_3$ |
| Phosphates | | $Na_4P_2O_7*10H_2O$ |
| | | $Na_2H_2P_2O_7*2H_2O$ |
| | | $NaHPO_4*2H_2O$ |
| Borates | borax | $Na_2[B_4O_5(OH)_4]*8H_2O$ |
| Manganites | potassium permanganate | $KMnO_4$ |
| Silicates | clay minerals, e.g. kaolinite | $Al_4[(OH)_8Si_4O_{10}]$ |
| Carbides | silicon carbide | SiC |
| | calcium carbide | $CaC_2$ |
| Organic substances | potassium hydrogen tartrate | $KC_4H_5O_6$ |
| | wheat flour | |
| | carbohydrate, e.g. sugar | |
| | wood dust | |
| Elements | carbon | C |
| Oxides | cerium(IV) oxide | $CeO_2$ |
| | manganese(IV) oxide | $MnO_2$ |
| | silica gel | $SiO_2*\times H_2O$ |
| Inorganic-organic mixtures | comprising baking powder, disodium phosphate, sodium hydrogen carbonate, starch | |

It has been found that particularly advantageous results are achieved with blowing agents which comprise carbonates and/or phosphates, in particular for layer thicknesses of the coating between 0.1 μm and 500 μm.

Furthermore, advantageous results were achieved with blowing agents which comprise starch. In particular, it has been found that rice starch, corn starch, and potato starch are particularly suitable as blowing agents.

The spatial configuration or shape of the pores may be controlled by the respective blowing agent that is employed. So, porous enamels with pores with a largely symmetrical shape can be obtained, as well as porous enamels with anisotropic pores. For example, in one embodiment of the invention the paste contains calcium carbonate as a blowing agent. In this embodiment, the pores resulting from the firing of the paste have symmetrical or at least largely symmetrical shapes in that the pores are largely spherical and have a circular or at least largely circular cross section. The table below shows various blowing agents and the resulting pore shapes.

By way of example, the glass powder is selected from the following composition range, in wt %:

| | |
|---|---|
| $SiO_2$ | 30-75, preferably 44-75 |
| $Al_2O_3$ | 0-25, preferably 0.2-25, more preferably 2-25 |
| $B_2O_3$ | 0-30, preferably 1-30, more preferably 5-30 |
| $Li_2O$ | 0-12 |
| $Na_2O$ | 0-25, preferably 0-15 |
| CaO | 0-12 |
| MgO | 0-9 |
| BaO | 0-27 |
| SrO | 0-4 |
| ZnO | 0-35, preferably 0-20 |
| $Bi_2O_3$ | 0-5 |
| $TiO_2$ | 0-10, preferably 0-5 |
| $ZrO_2$ | 0-7 |
| $As_2O_3$ | 0-1 |
| $Sb_2O_3$ | 0-1.5 |
| F | 0-3 |
| Cl | 0-1, preferably 0 |
| $H_2O$ | 0-3. |

The glass advantageously comprises a minimum $Al_2O_3$ content of 1 wt %, preferably at least 2 wt %.

According to a further advantageous embodiment, the glass comprises at least 1 wt % of $B_2O_3$, preferably at least 5 wt %.

According to yet another advantageous embodiment, the glass comprises at least 1 wt % of an alkali oxide, selected from the group consisting of $Na_2O$, $Li_2O$, and $K_2O$, or mixtures of these oxides.

According to yet another advantageous embodiment, the glass comprises at least 1 wt % of a further oxide or mixture of oxides, selected from the group consisting of CaO, MgO, BaO, SrO, ZnO, $ZrO_2$, and $TiO_2$.

According to a further embodiment, the glass is selected from the following composition range, in wt %:

| | |
|---|---|
| $SiO_2$ | 6-65, preferably 10-65, more preferably 15-65 |
| $Al_2O_3$ | 0-20 |
| $B_2O_3$ | 0-40, preferably 1-30, more preferably 3-30 |
| $Li_2O$ | 0-12 |
| $Na_2O$ | 0-18 |
| $K_2O$ | 0-17 |
| CaO | 0-17 |
| MgO | 0-12 |
| BaO | 0-38 |
| SrO | 0-16 |
| ZnO | 0-70 |
| $TiO_2$ | 0-5 |
| $ZrO_2$ | 0-5 |
| $Bi_2O_3$ | 0-75, preferably 0-60, more preferably 5-60, most preferably 10-60 |
| CoO | 0-5 |
| $Fe_2O_3$ | 0-5 |
| MnO | 0-10 |
| $CeO_2$ | 0-3 |
| F | 0-3 |
| Cl | 0-1 |
| $H_2O$ | 0-3. |

The glass flux may furthermore be selected from the following types of glass: alkali-free glasses, alkali-containing glasses, silicate glasses, borosilicate glasses, zinc silicate glasses, zinc borate glasses, zinc borosilicate glasses, bismuth borosilicate glasses, bismuth borate glasses, bismuth silicate glasses, phosphate glasses, zinc phosphate glasses, aluminosilicate glasses, or lithium aluminosilicate glasses.

As a matter of course it is also possible for the glass powder to comprise mixtures of different glasses.

When preparing the suspension, it is possible to initially only introduce the glass powder into a suspension agent. The suspension agent is a liquid and may comprise water, for example. Preferably, the suspension agent comprises solvents, for example organic solvents. The solvents preferably have a vapor pressure of less than 10 bar, preferably less than 5 bar, and most preferably less than 1 bar. This includes, for example, water, n-butanol, diethylene glycol monoethyl ether, tripropylene glycol monomethyl ether, terpineol, and n-butyl acetate, n-(n-butoxyethoxy)ethanol, (n-methoxymethylethoxy)propanol, which may be provided alone or in mixtures. It is also possible to use commercially available screen printing oils.

In order to be able to adjust the desired viscosity, appropriate additives are used, which may be inorganic or organic. Organic additives include, for example, hydroxyethyl cellulose, and/or hydroxypropyl cellulose, and/or xanthan, and/or polyvinyl alcohol, and/or polyethylene alcohol, and/or polyethylene glycol, block copolymers, and/or triblock copolymers, and/or tree resins, and/or polyacrylates, and/or polymethacrylates.

After the powder has been introduced into the suspension agent, the mixture is homogenized in a next step, for example in a three-roll chair.

Furthermore, it is possible to introduce into a further suspension agent and homogenize a further powder which comprises the blowing agent, for example. The two suspensions can then be mixed together.

It is also possible to first produce a mixture of the different powders, for example comprising a glass powder, a blowing agent, and a pigment, and to homogenize this mixture in a tumbler, for example. Then, a paste may be prepared from this powder as described above.

At a shear rate of 200/s as measured with a cone-plate viscometer, the suspension preferably has a viscosity between 2,000 mPa·s and 20,000 mPa·s, preferably between 2,500 mPa·s and 15,000 mPa·s, most preferably between 3,000 mPa·s and 10,000 mPa·s.

(b) Applying the suspension to a substrate so that at least part of the substrate is covered by the suspension.

The applying of the suspension to the substrate such as, for example, a glass or glass ceramic substrate, in particular a glass or glass ceramic substrate having a low coefficient of thermal expansion, may be done over the entire surface, but it is also possible for the suspension to be applied in the form of particular patterns. For example, decorative patterns or characters or a raster pattern may be applied to the substrate in this way.

Suitable coating techniques include, in principle, all common liquid coating processes. For example, the suspension may be applied by a printing technique, in particular screen printing, pad printing, or ink jet printing. Application in a decal process is also possible. Application by spraying, spin coating, or roll coating is possible as well. In order to ensure optimum processability of the suspension, the suspension may be adapted for the respective application process using various auxiliaries, for example additives, solvents, or thixotropic agents. The necessary additives which are mostly organic will evaporate during firing.

Particularly preferred application techniques include ink jet printing, offset printing, pad printing, wet decal transfer, screen printing, dip coating, roll coating, spray coating, doctor blade coating, flooding, and spin coating.

(c) Preferably fixing the suspension applied in step (b) on the substrate, preferably at a temperature between 0° C. and 300° C.

Thus, after the suspension has been applied to at least part of the substrate such as a glass or glass ceramic substrate, in particular a glass or glass ceramic substrate having a low coefficient of thermal expansion in step (b), the suspension is preferably fixed on the substrate. This may be achieved, for example, by a drying step at elevated temperatures such as at a temperature between 0° C. and 300° C. The fixing of the suspension on the substrate is particularly advantageous if, after the suspension has been applied to the substrate, the latter has to be transferred to another processing unit, for example in order to perform further processing steps. Depending on the exact composition of the suspension, a favorable temperature range has found to be between 0° C. and 100° C. and between 100° C. and 300° C.

In addition to the purely thermal fixing of the suspension on the substrate, it is also possible to promote the fixing by IR radiation and/or by UV radiation. Also, in the case of suitable adjustment of the suspension, the fixing may be achieved solely by IR radiation and/or UV radiation.

(d) Annealing the at least partially coated substrate at a temperature between 500° C. and 900° C., preferably 550° C. and 900° C., so that the blowing agent decomposes to form at least one volatile substance and causes formation of closed pores in the coating.

The annealing is preferably performed at a temperature between 500° C. and 900° C., more preferably 550° C. and 900° C.

On the one hand, the blowing agent decomposes during the annealing process, and at the same time firing of the coating on the substrate is achieved. As a result, a coating is formed which includes closed pores and which exhibits a good adhesive bond to the substrate.

(e) Cooling the substrate to room temperature.

According to an advantageous embodiment, the coating is applied to the substrate, i.e., for example, a glass or glass ceramic substrate, in particular a glass or glass ceramic substrate having a low coefficient of thermal expansion, in a laterally patterned form of a predetermined pattern. In this way it is very easy to mark cooking zones, for example, or to exclude areas from the coating, in which electro-optical indicators such as displays are mounted. It is also very easy in this way to create frame prints and decorative prints for fireplace viewing windows and cooking ovens.

It may furthermore be advantageous to apply a non-adhering cover sheet to the layer after the suspension has been applied, and to keep the cover sheet on the layer during the annealing. In this way, the layer retains a uniform thickness. The arising of unfavorable layer unevenness or corrugations is avoided. A cover sheet is referred to as "non-adhering" in particular if the cover sheet can be removed from the coating substantially without residue after the annealing.

The suspension is advantageously applied by a printing technique, for example by ink-jet printing, offset printing, pad printing, or screen printing, or by rolling, flooding, dipping, spraying, doctor blading, or spin coating

EXAMPLES

The invention will now be explained in more detail by way of examples.

The following tables list some composition ranges of exemplary glass families, from which glass powders for a coating in accordance with embodiments are advantageously selected.

Glass families 1

| wt % | Glass A | Glass B | Glass C | Glass D | Glass E | Glass F | Glass G | Glass H | Glass I | Glass J |
|---|---|---|---|---|---|---|---|---|---|---|
| $SiO_2$ | 44-57 | 53-63 | 57-62 | 47-52 | 40-50 | 63-73 | 50-66 | 45-60 | 45-75 | 25-70 |
| $Al_2O_3$ | 5-25 | 15-25 | 5-8 | 2-6 | 9-15 | 0-7 | 0-20 | 6-17 | 1-10 | 0-20 |
| $B_2O_3$ | 0-27 | 15-22 | 18-23 | 17-21 | 10-15 | 12-29 | 0-8 | 0-10 | 10-30 | 10-30 |
| $Li_2O$ | 0-10 | 2-7 | 2-6 | 3-5 | 0-4 | 0-6 | 0-12 | 0-7 | 0-5 | 0-7 |
| $Na_2O$ | 0-10 | 0-1 | 0-1 | 1-5 | 1-4 | 0-8 | 7-15 | 0-7 | 0-10 | 0-20 |
| $K_2O$ | 0-10 | 0-1 | 0-4 | 5-10 | 0-3 | 0-8 | 0-3 | 0-7 | 0-5 | 0-5 |
| CaO | 0-4 | 1-4 | 1-2 | 0-2 | 0-3 | 0-5 | 0-10 | 0-12 | 0-4 | 0-5 |
| MgO | 0-3 | 1-4 | 0-2 | 0-1 | 0-3 | 0.1-5 | 3-8 | 0-9 | 0-4 | 0-3 |
| BaO | 0-4 | 0-1 | 0-2 | 0-2 | 16-24 | 0-5 | 0-15 | 13-27 | 1-10 | 0-2.5 |
| SrO | 0-4 | 1-4 | 0.5-2 | 0-1 | 0-2 | 0-4 | 0-4 | 0-4 | 0-4 | 0-1 |
| ZnO | 0-15 | 1-4 | 0-2 | 0-3 | 8-15 | 0-15 | 0-5 | 3-17 | 0-20 | 1-35 |
| $TiO_2$ | 0-3 | 0-1 | 0-2 | 0-2 | 0-3 | 0-5 | 0-5 | 0-2 | 0-2 | 0-10 |
| $ZrO_2$ | 0-7 | 1-4 | 2-5 | 0-2 | 0-4 | 0-5 | 0-5 | 0-7 | 0-7 | 0-2.5 |
| $As_2O_3$ | 0-1 | 0-1 | 0-1 | 0-1 | 0-1 | 0-1 | 0-1 | 0-1 | 0-1 | 0-1 |
| $Sb_2O_3$ | 0-1.5 | 0-1 | 0-1 | 0-1 | 0-1.5 | 0-1 | 0-1 | 0-1 | 0-1 | 0-1 |
| F | 0-3 | 0-1 | 0-1 | 0-1 | 0-1 | 0-1 | 0-1 | 0-1 | 0-2 | 0-3 |
| Cl | 0-1 | 0-1 | 0-1 | 0-1 | 0-1 | 0-1 | 0-1 | 0-1 | 0-1 | 0-1 |

Glass families 2

| wt % | Glass K | Glass L | Glass M | Glass N | Glass O | Glass P | Glass Q |
|---|---|---|---|---|---|---|---|
| $SiO_2$ | 25-55 | 35-65 | 30-54 | 6-20 | 6-15 | 45-65 | 20-60 |
| $Al_2O_3$ | 3-18 | — | 0-17.5 | 0-5 | — | 0-15 | 0-10 |
| $B_2O_3$ | 5-25 | — | 13-28 | 20-38 | 20-28 | 5-30 | 2-25 |
| $Li_2O$ | 0-12 | 0-6 | 3-6 | — | — | 0-10 | 0-7 |
| $Na_2O$ | 3-18 | 0-6 | 4-10 | — | — | 0-10 | 0-5 |
| $K_2O$ | 3-18 | 0-6 | 0-2 | — | — | 0-10 | 0-2.5 |
| CaO | 3-17 | 0-12 | 0-6 | — | — | 0-5 | 0-1 |
| MgO | 0-10 | 0-12 | 0-4 | — | — | 0-5 | 0-1 |
| BaO | 0-12 | 0-38 | — | — | — | 0-20 | — |
| SrO | — | 0-16 | 0-4 | — | — | 0-16 | — |
| ZnO | — | 17.5-38 | 3-13 | 35-70 | 58-70 | 0-35 | 0-15 |
| $TiO_2$ | 0-5 | — | 0-2 | 0-5 | — | 0-5 | 0-5 |
| $ZrO_2$ | 0-3 | — | 0-2 | 0-5 | — | 0-5 | 0-2.5 |
| $Bi_2O_3$ | — | — | — | 0-20 | — | 0-20 | 10-75 |
| CoO | — | — | — | 0-5 | — | — | — |
| $Fe_2O_3$ | — | — | — | 0-5 | — | — | — |
| MnO | — | — | — | 0-10 | 0.5-1 | — | — |
| $CeO_2$ | — | — | — | — | 0-3 | — | — |
| F | — | — | 0-3.3 | 0-6 | — | — | — |

The following table specifies characteristic temperatures for four test glasses, of which glasses 1 and 2 are advantageously suitable of being coated during what is known as primary firing, i.e. firing during a thermal treatment of what is known as green glass which ceramizes, i.e. is converted into a glass ceramic, by such thermal treatment. In the case of glasses 3 and 4, the firing is advantageously effected during what is known as secondary firing, i.e. in a separate tempering step which is performed independently of any temperature treatment of a substrate.

TABLE

Test glasses

| | | Primary firing | | Secondary firing | |
|---|---|---|---|---|---|
| Glass ID | | Glass 1 | Glass 2 | Glass 3 | Glass 4 |
| Glass family | | A | B | P | P |
| $T_g$ (annealing point) (log □) | 13 | 578 | 675 | 477 | 468 |
| SP (log □) | 7.6 | 755 | 939 | 697 | 604 |
| WP (log □) | 4 | 1064 | | 863 | 840 |

| Composition | wt % | 1 | 2 | 3 | 4 | 5 | 6 | 7 | 8 | 9 | 10 |
|---|---|---|---|---|---|---|---|---|---|---|---|
| $Li_2O$ | | 0.1 | 0.2 | 3.1 | 0.8 | 4.4 | 1.3 | 4 | | 3.1 | 4.4 |
| $Na_2O$ | | 3.3 | 10.1 | | 2.4 | 0.2 | | 10 | 18.8 | | 0.2 |
| $K_2O$ | | 0.6 | 1.5 | | 1.7 | | 0.5 | | 0 | | |
| MgO | | | | 1.7 | | | 0.1 | 1 | | 1.7 | |

TABLE-continued

Test glasses

| | | | | | | | | | | |
|---|---|---|---|---|---|---|---|---|---|---|
| CaO | | 0.0 | 2.0 | 0.5 | | 0.2 | 3 | 0.9 | 2 | |
| SrO | | | | | | | | | 2.3 | |
| BaO | | | | 1.1 | | | | | | |
| ZnO | 9.6 | 28.0 | 3.4 | | | 0.1 | 8 | 8.5 | 2.2 | |
| $B_2O_3$ | 4.9 | 15.8 | 16.7 | 21.9 | 22.8 | 7.2 | 18 | 13.1 | 16.7 | 23.1 |
| $Al_2O_3$ | 0.2 | 1.6 | 16.6 | 5.1 | 7.2 | 3.3 | 5 | 1 | 16.6 | 5.9 |
| $SiO_2$ | 27.0 | 36.0 | 54.4 | 63.4 | 56.0 | 21.2 | 50 | 50.9 | 54.3 | 57 |
| $P_2O_5$ | | 0.0 | | | | | | | | |
| $TiO_2$ | 2.2 | 5.2 | | | | 0.1 | 1 | 6.3 | | |
| $ZrO_2$ | | 0.8 | 1.3 | | | 2 | | 0.5 | 1.1 | |
| $SnO_2$ | | | | | | | | | | |
| $Bi_2O_3$ | 52.0 | 0.1 | | | 10.0 | 64 | | | | 9.4 |
| F | 0.2 | 0.9 | | 2.2 | | | | | | |
| Cl | | | 0.8 | 0.5 | | | | | | |
| Total | 100 | 100 | 100 | 100 | 100.60 | 100 | 100 | 100 | 100.00 | 100 |

Properties glassy

| | | | | | | | | | | |
|---|---|---|---|---|---|---|---|---|---|---|
| Transition temperature Tg | °C. | | ~480 | 550 | 430 | 474 | 445 | 490 | 536 | 578 | 478 |
| Softening point SP ($10^{7.6}$ dPa·s) | °C. | | ~560 | 750 | 715 | 660 | 548 | 594 | 644 | 755 | 698 |
| Thermal expansion $\alpha_{20/300}$ | $10^{-6}$/K | | ~12 | 4.40 | 4.1 | 4.8 | 7.3 | 8.6 | 9.7 | 4.4 | 4.8 |
| Density | g/cm$^3$ | | ~2.9 | 2.40 | 2.21 | 2.41 | 4.52 | 2.48 | 2.69 | 2.41 | 2.43 |

The glass powders listed in the table above have been found to be particularly advantageous with regard to processability when coating a substrate made of soda-lime glass or borosilicate glass or aluminosilicate glass, and also with regard to the optical, mechanical, and chemical properties of the corresponding coating.

SP is known as the softening point, WP is the working point or processing temperature. The second column shows the values of decimal logarithm of the viscosity (in dPa·s). Temperatures are given in ° C. in each case.

The following table specifies various coatings on a glass ceramic substrate in terms of their properties.

| No. | Glass ID | Blowing agent (vol %) | Pigment (vol %) | Screen | Firing temperature (° C.) | Ball drop value | Remarks | Tape test |
|---|---|---|---|---|---|---|---|---|
| 0 | Glass 3 | none | 15% iron-cobalt-chromium with black spinel (d50~0.5-2 μm) | 77 | 720 | failed | slightly transparent, porous | chipping |
| 1 | Glass 3 | 15% $CaCO_3$ | 15% iron-cobalt-chromium with black spinel (d50~0.5-2 μm) | 77 | 700 | passed | opaque, porous | 10% |
| 2 | Glass 3 | 15% $CaCO_3$ | 15% iron-cobalt-chromium with black spinel (d50~0.5-2 μm) | 77 | 720 | passed | opaque, porous | 95% |
| 3 | Glass 3 | 30% $CaCO_3$ | 15% iron-cobalt-chromium with black spinel (d50~0.5-2 μm) | 77 | 740 | passed | opaque, porous | ok |
| 4 | Glass 3 | 30% $CaCO_3$ | 15% chromium-iron-nickel black spinel d50~1-2.5 μm chromium-iron-nickel black spinel d50~1-2.5 μm | 77 | 740 | passed | slightly transparent, porous | ok |
| 5 | Glass 3 | 15% $Na_2HPO_4 \cdot 2H_2O$ | 15% $CoFe_2O_4$ (nano) | 77 | 720 | passed | slightly transparent, $H_2O$ resistant | ok |
| 6 | Glass 3 | 15% $Na_2HPO_4 \cdot 2H_2O$ | 15% chromium-iron-nickel black spinel d50~1-2.5 μm chromium-iron-nickel black spinel d50~1-2.5 μm | 100 | 750 | passed | nearly opaque, $H_2O$ resistant | ok |
| 7 | Glass 4 | 15% $Na_2HPO_4 \cdot 2H_2O$ | 15% chromium-iron-nickel black spinel d50~1-2.5 μm chromium-iron-nickel black spinel d50~1-2.5 μm (fine) | 77 | 720 | failed | opaque, $H_2O$ resistant | ok |
| 8 | Glass 4 | 15% $Na_2HPO_4 \cdot 2H_2O$ | 15% iron-cobalt-chromium with black spinel (d50~0.5-2 μm) | 77 | 660 | failed | opaque, $H_2O$ resistant | ok |
| 9 | Glass 4 | 20% $Na_2HPO_4 \cdot 2H_2O$ | 15% iron-cobalt-chromium with black spinel (d50~0.5-2 μm) | 77 | 680 | passed | nearly opaque, $H_2O$ resistant | ok |
| 10 | Glass 4 | 20% $Na_2HPO_4 \cdot 2H_2O$ | 15% chromium-iron-nickel black spinel d50~1-2.5 μm chromium-iron-nickel black spinel d50~1-2.5 μm (fine) | 77 | 680 | passed | opaque, $H_2O$ resistant | ok |
| 11 | Glass 4 | 20% $Na_2HPO_4$ | 15% iron-cobalt-chromium with black spinel (d50~0.5-2 μm) | 77 | 720 | failed | opaque, $H_2O$ resistant | ok |

-continued

| No. | Glass ID | Blowing agent (vol %) | Pigment (vol %) | Screen | Firing temperature (° C.) | Ball drop value | Remarks | Tape test |
|---|---|---|---|---|---|---|---|---|
| 12 | Glass 4 | 20% NaPO$_3$ | 15% chromium-iron-nickel black spinel d50~1-2.5 μm chromium-iron-nickel black spinel d50~1-2.5 μm | 77 | 740 | failed | nearly opaque, H$_2$O resistant | ok |
| 13 | Glass 4 | 15% rice starch | 15% iron-cobalt-chromium with black spinel (d50~0.5-2 μm) | 77 | 740 | failed | opaque, H$_2$O resistant | ok |
| 14 | Glass 4 | 15% monosaccharide | 15% iron-cobalt-chromium with black spinel (d50~0.5-2 μm) | 77 | 740 | failed | opaque, H$_2$O resistant | ok |
| 15 | Glass 4 | 15% KNO$_3$ | 15% iron-cobalt-chromium with black spinel (d50~0.5-2 μm) | 77 | 740 | failed | opaque, H$_2$O resistant | ok |
| 16 | Glass 4 | 25% Mowital ® | 15% iron-cobalt-chromium with black spinel (d50~0.5-2 μm) | 77 | 740 | failed | opaque, H$_2$O resistant | ok |

The percentages given for the blowing agent and for the pigment are based on vol % of the total content of solids. Furthermore, the firing temperature is specified. The layers were obtained by screen printing using a screen with a 77 mesh, i.e. a mesh with 77 threads per 1 cm.

A coating is referred to as "water-resistant" or "H$_2$O resistant" if water vapor does not penetrate through the layer. This is particularly important for full-surface coatings, since such coatings in the form of an underside or backside coating often face the interior of the oven, that is to say they are disposed on the side of the glass or glass ceramic substrate facing away from the user during intended use. In this case, no condensed water and no shadow of condensed water should be visible from above.

If the layer is in the form of an underside or backside coating, i.e. a coating that is disposed on the side of the glass or glass ceramic substrate facing away from the user during intended use thereof, such as, for example, a backside coating of a fireplace viewing window or oven viewing window, for instance a cooking oven door, it may be important that the areas lying behind the substrate as seen from the user are not visible when viewed. Such a backside coating should therefore advantageously be opaque to the extent possible, or at least there should be a possibility of applying such a backside coating in a manner so that it is opaque. This is verified by a visual assessment in which items arranged below the glass or glass ceramic substrate are placed at a distance of approximately 12 cm from the substrate. The visual assessment or inspection aims to examine whether the items are visible from above. For this purpose, the technical rules mentioned above for performing a visual inspection are taken into account, and the rules for direct local visual inspection are preferred.

Slightly transparent means that items disposed below will appear to be easily visible with a little light. A coating is said to be opaque if nothing is visible in this test. More particularly, the coating is opaque or substantially opaque if $\tau_{vis}$ (in-line transmittance) assumes a value of less than 10% in the wavelength range of visible light (~380 to ≤700 nm).

In addition, opacity or optical density may be determined with a transmitted light densitometer (X-Rite 361 TX). A sheet can be considered to be opaque at a value of at least 2.5, which means that no items will be visible in a visual inspection according to the nomenclature mentioned above.

Furthermore, the value of the ball drop test is specified. This is a test for determining mechanical strength. For this purpose, at least 5 samples with lateral dimensions of 10*10 cm$^2$ and a thickness of about 4 mm were provided with the coating according to the exemplary embodiments. The samples were then placed on a rubber-coated support frame while ensuring that the rubber support was free of glass fragments or similar particles that could potentially damage the glass or glass ceramic, and that the sample was not clamped to the frame. Then, a steel ball with a diameter of 36 mm and a mass of 200 g is dropped in free fall onto the surface, in a drop rig, starting with a drop height of 5 cm. The drop height can be read from the drop rig and is measured between the lowest point of the steel ball and the upper surface of the sample. The drop height is then increased by 5 cm in each case until the sample breaks. The last drop height passed is noted. Strength is considered to be sufficient if the mean value of the last drop height passed is more than 12.5 cm.

Adhesion of the layer was determined by a tape test. For this purpose, a strip of tape such as Tesa tape is applied and firmly pressed onto the layer. Then, the tape is removed. The test is passed if no detachment occurs.

Respective examples for the glasses 1 and 2 can be found in the table below.

| No. | Glass ID | Blowing agent (vol %) | Pigment (vol %) | Screen | Firing temperature (° C.) | Ball drop value | Remarks | Tape test |
|---|---|---|---|---|---|---|---|---|
| 17 | Glass 1 | none | 15% chromium-iron-nickel black spinel d50~1-2.5 μm | 77 | 750 | failed | slightly transparent, porous | ok |
| 18 | Glass 1 | 5% CaCO$_3$ | 15% chromium-iron-nickel black spinel d50~1-2.5 μm | 77 | 735 | failed | opaque, H$_2$O resistant | ok |
| 19 | Glass 1 | 5% CaCO$_3$ | 15% chromium-iron-nickel black spinel d50~1-2.5 μm | 140 | 735 | failed | opaque, H$_2$O resistant | ok |
| 20 | Glass 1 | 10% CaCO$_3$ | 15% chromium-iron-nickel black spinel d50~1-2.5 μm | 77 | 735 | failed | opaque, slightly porous | ok |

-continued

| No. | Glass ID | Blowing agent (vol %) | Pigment (vol %) | Screen | Firing temperature (° C.) | Ball drop value | Remarks | Tape test |
|---|---|---|---|---|---|---|---|---|
| 21 | Glass 1 | 10% $CaCO_3$ | 15% chromium-iron-nickel black spinel d50~1-2.5 μm | 140 | 735 | failed | opaque, slightly porous | ok |
| 22 | Glass 1 | 5% $CaCO_3$ | 15% chromium-iron-nickel black spinel d50~1-2.5 μm | 54 | 920 | passed | opaque, slightly porous | ok |
| 23 | Glass 2 | 10% $CaCO_3$ | 15% chromium-iron-nickel black spinel d50~1-2.5 μm | 54 | 920 | passed | opaque, slightly porous | ok |
| 24 | Glass 2 | 15% $Na_2HPO_4 \cdot 2H_2O$ | 15% $CoFe_2O_4$ (nano) | 77 | 800 | passed | nearly opaque, $H_2O$ resistant | ok |
| 25 | Glass 2 | 15% $Na_2HPO_4 \cdot 2H_2O$ | 15% chromium-iron-nickel black spinel d50~1-2.5 μm | 100 | 820 | passed | nearly opaque, slightly porous | ok |
| 26 | Glass 2 | 15% $Na_2HPO_4 \cdot 2H_2O$ | 15% iron-cobalt-chromium with black spinel (d50~0.5-2 μm) | 77 | 800 | failed | nearly opaque, $H_2O$ resistant | ok |
| 27 | Glass 2 | 20% $Na_2HPO_4 \cdot 2H_2O$ | 15% iron-cobalt-chromium with black spinel (d50~0.5-2 μm) | 77 | 800 | passed | opaque, slightly porous | ok |
| 28 | Glass 2 | 20% $Na_2HPO_4 \cdot 2H_2O$ | 15% chromium-iron-nickel black spinel d50~1-2.5 μm (fine) | 77 | 800 | passed | opaque, slightly porous | ok |
| 29 | Glass 2 | 20% $Na_2HPO_4$ | 15% iron-cobalt-chromium with black spinel (d50-0.5-2 μm) | 77 | 820 | passed | opaque, $H_2O$ resistant | ok |
| 30 | Glass 2 | 20% $NaPO_3$ | 15% chromium-iron-nickel black spinel d50~1-2.5 μm | 77 | 850 | passed | nearly opaque, $H_2O$ resistant | ok |
| 31 | Glass 2 | 15% rice starch | 15% iron-cobalt-chromium with black spinel (d50~0.5-2 μm) | 54 | 900 | passed | opaque, $H_2O$ resistant | ok |
| 32 | Glass 2 | 15% monosaccharide | 15% iron-cobalt-chromium with black spinel (d50~0.5-2 μm) | 77 | 875 | passed | opaque, $H_2O$ resistant | ok |
| 33 | Glass 2 | 15% $KNO_3$ | 15% iron-cobalt-chromium with black spinel (d50~0.5-2 μm) | 54 | 800 | passed | opaque, $H_2O$ resistant | ok |
| 34 | Glass 2 | 25% Mowital ® | 15% iron-cobalt-chromium with black spinel (d50~0.5-2 μm) | 77 | 850 | passed | opaque, $H_2O$ resistant | ok |

The layer thickness is largely determined by the manner of application. In screen printing, for example, the resulting layer thickness depends on the number of threads and the pasting ratio (PR). The influence of the thread count on coatings according to embodiments can be found in the table below. Furthermore, the influence of the percentage of blowing agent was examined here for a specific coating system. Layer thicknesses are specified in μm in each case. For a lower PR (e.g. 10:3) and the same mesh size, layer thicknesses accordingly increase by up to 3 times

| Mesh size (PR 10:12) | Layer thickness after foaming with 5 vol % blowing agent (μm) | Layer thickness after foaming with 10 vol % blowing agent (μm) |
|---|---|---|
| 77 mesh | 5-6.2 | 4.8-6.9 |
| 100 mesh | ~4 | ~4.5 |
| 140 mesh | 1.7-2.3 | ~3.4 |

The resulting layer thickness can also be varied when the layer is applied using a doctor blade. Values can be found in the table below.

| Setting of doctor blade gap width | After foaming (μm) |
|---|---|
| 30 μm | ~15-30 |
| 100 μm | ~40-55 |
| 250 μm | ~100-150 |
| 500 μm | ~130-250 |

The composition of a first suspension preparation can be found in the following table.

| S-0001 | Solids | Solvent | Dispersing agent | Binder | Plasticizer |
|---|---|---|---|---|---|
| Density (g/cm³) | 2.58 | | 1.2 | 1.1 | 1.073 |
| vol % | 30.0 | 57.4 | 0.4 | 7.0 | 6.0 |
| wt % | 56.1 | 33.9 | 0.3 | 5.5 | 4.2 |

The densities of the respective constituents are listed in the row labeled "Density". The percentages relate to the entire suspension.

A second exemplary suspension is specified in the following table.

| S-0002 | Solids | Solvent | Dispersing agent | Binder | Plasticizer |
|---|---|---|---|---|---|
| Density (g/cm³) | 2.58 | | 1.2 | 1.1 | 1.073 |
| vol % | 45 | 31 | 5 | 10 | 9 |
| wt % | 70 | 15.2 | 3.0 | 6.5 | 5.2 |

The two suspensions specified above are particularly advantageous for application by the doctor blading technique.

Doctor blading is a wiping technique. First, ink is applied to the substrate surface in excess, then the coating material is distributed and the excess is removed using a doctor blade that defines a predetermined doctor blade gap. The choice of the doctor blade gap determines the layer thickness of the wet film. In this way, large flat surfaces can be coated using the doctor blading technique. In doctor blading, the coating thickness is only limited by the critical film thickness of the ink system. The doctor blade technique is characterized as follows: layer thicknesses from 4 μm up to the critical film thickness are possible; only suitable for flat surfaces; easy to automate (large quantities possible); only complete wetting of the surface possible.

The doctor blading process comprises the following steps:

Preparing a suspension from glass, blowing agent, and solvent (for example comprising distilled $H_2O$), including: Grinding glass to a grain size of d50~1-10 μm. And, mixing glass powder with blowing agent (blowing agent content from 0.5 vol % to 40 vol %, preferably from 5 vol % to 30 vol %, most preferably from 15 to 25 vol %) and solvents as well as with surfactants, dispersing agents, binders, plasticizers, and flocculating agents to obtain a suspension with a viscosity between 2000 mPa·s and 8000 mPa·s, preferably 2500 mPa·s to 7000 mPa·s, most preferably 3000 mPa·s to 6000 mPa·s, and a solids content from 15 vol % to 50 vol %, preferably from 20 vol % to 40 vol %, most preferably of about 35 vol %.

Depending on the manufacturer and chemistry, the added amount of dispersing agents, binders, plasticizers, etc. may vary between 0.25 and 25 wt %, based on the solids content.

SOLVENTS include water, organic solvents (mostly methyl ethyl acetone, trichlorethylene, acetones, alcohols, liquid waxes, refined petroleum, polymers (e.g. PVB, PVA), and mixtures thereof) and serve to dissolve or slurry particles.

SURFACTANTS (comprising polar and non-polar surfactants, ionic surfactants, and non-ionic surfactants, such as, e.g., ethoxylated nonylphenol or ethoxylated tridecyl alcohol, sodium stearate, or sodium diisopropylnaphthalene sulfate, and dodecyltrimethylammonium chloride) can be used to improve the wetting of the particles with the solvent.

LIQUEFYING/DISPERSING AGENTS are used to avoid agglomeration through electrostatic repulsion (water-based [aqueous] milieu) or through steric repulsion. Inorganic dispersing agents in a water-based milieu are based, for example, on sodium carbonate, sodium silicate, sodium borate, and tetrasodium pyrophosphate. Organic dispersing agents are preferably sodium polyacrylate, ammonium polyacrylate, sodium citrate, sodium succinate, sodium tartrate, sodium polysulfonate, or ammonium citrate.

Other liquefying and dispersing agents which are preferably used in the field of industrial ceramics are based on alkali-free polyelectrolytes, carboxylic acid esters, and alkanolamines, for example. Examples of strong polyelectrolytes include sodium polystyrene sulfonate (anionic) or poly(diallyldimethylammonium) chloride (cationic); representatives of weak polyelectrolytes include polyacrylic acid (acidic) or polyethyleneimine (basic). The properties of a polyelectrolyte solution are largely determined by the repulsive interactions of the equally charged groups on the polymer chain.

Further examples of dispersants are $H_2O$, ROH, $C_7H_8$ (toluene), $C_2HCl_3$ (trichlorethylene), which prevent agglomeration or flocculation of the powder particles through interaction with the powder surface.

Darvan®, Dolapix®, polyaryl acids, ammonium oxalate (in the form of monohydrate), oxalic acid, sorbitol ammonium citrate or others are also suitable for this purpose.

d) BINDERS/FLOCCULATING AGENTS are used to increase viscosity or to delay settling of the particles. The binders may also be used to increase the mechanical strength of the green body (an advantage for injection molding and die casting techniques). Available are colloidal binders (mainly used in the field of traditional ceramics) and molecular binders (ionic, cationic, and anionic polymers). Examples of synthetic binders include: polyvinyl alcohol (PVA), polyvinyl butyral (PVB), polyvinyl methacrylate (PMA), and polyacetals. Examples of plant-based binders are cellulose, waxes, oils, or paraffin.

e) PLASTICIZERS serve to adjust the transformation temperature of a polymer binder to temperatures below the ambient temperature. Examples include residual water, PVB, PMMA, light glycols (polyethylene glycol (PEG), glycerol), phthalates (dibutyl phthalate, DBP, benzyl phthalate, BBP), and others.

Application to glass ceramic by doctor blading technique onto the substrate such as a glass ceramic sheet.

Drying the applied layer at 100-300° C.

Foaming and firing at 550-900° C., preferably 600-900° C.

Another example for coating using a doctor blading process is specified below:

Preparing a suspension from glass, blowing agent, and solvent (distilled $H_2O$), including: Grinding glass to a grain size of d50~1-10 μm. Mixing glass powder with blowing agent (blowing agent content from 0.5 vol % to 40 vol %, preferably from 5 vol % to 30 vol %, most preferably from 15 to 25 vol %). Preparing the suspension: for this purpose, de-agglomerating the powders using solvents and dispersant; adding binder and further homogenizing; degassing the pourable suspension. Depending on the manufacturer and chemistry, the added amounts of dispersants, binders, etc. can vary between 0.25 and 25 wt % based on the solids content.

The pourable suspension was prepared in PE containers (100 or 250 ml filling volume) with the addition of aluminum oxide grinding balls (grinding ball diameter approximately 3 and 5 mm) in a tumble mixer (Turbula, WAB AG, Basel, Switzerland). The PE containers were filled with the suspension to approx. 50%, the proportion of grinding balls was about 30% of the container volume. The finished pourable suspension was then sieved using a steel mesh (mesh size 0.224 mm) to remove any remaining agglomerates or undissolved organic constituents and the grinding balls.

Solids content of suspension was from 15 vol % to 50 vol %, preferably from 20 vol % to 40 vol %, most preferably approximately 35 vol %.

Viscosity was from 2000 mPa·s to 8000 mPa·s, preferably from 2500 mPa·s to 7000 mPa·s, most preferably from 3000 mPa·s to 6000 mPa·s, at a shear rate of 20 $s^{-1}$ and a solids content of 35 vol %.

The suspension exhibits thixotropy.

In one embodiment, Mowiol (polyvinyl alcohols, from Kuraray) is used as a temporary binder. It is used with different molecular weights: Mowiol 28-99=145,000 g/mol, and Mowiol 4-88=131,000 g/mol. The viscosity of the suspension can be varied through the chain length of the Mowiols.

Water is provided in a beaker and heated to 90° C. Mowiol, dispersants, and plasticizers/binding agents (binders) are added to the water under constant stirring in the dissolver. After the solution has been stirred for 20 minutes, the evaporated water is refilled so that the mixing ratio remains constant. Then, LAS glass ceramic powder with a d50 of ~1.8 μm and a d99 of ~14 μm is gradually added. The dispersion is stirred for 30 min using a dissolver.

Overnight, the suspension is further homogenized by being rotated on a roller bench in a container additionally filled with $ZrO_2$ balls (Ø=5 mm, 10 vol % based on the suspension volume). The $ZrO_2$ balls are then removed using a sieve. The suspension, which is now heavily bubbled, is degassed on a rotary evaporator by applying a pressure of <50 mbar.

| wt % | |
|---|---|
| 1% | Solvent |
| 1% | rheological additives binders for liquids |
| 0.07% | temporary binder |
| 70% | glass frit + foaming agent |

The so obtained suspension is then applied onto a glass ceramic by screen printing. The layer is dried at a temperature between 100° C. and 300° C. Foaming and firing are performed at temperatures between at least 550° C., preferably at least 600° C. and at most 900° C., most preferably between at least 650° C. and at most 900° C.

According to another embodiment of the preparation method it is contemplated that the suspension provided in step (a) comprises at least one IR-reflecting pigment. According to this variant, the suspension or paste further contains a glass powder with a softening point $T_{SP,glass\ powder}$ and a screen printing medium.

Once the suspension has been applied to the glass or glass ceramic substrate by screen printing, the applied layer is fired at temperatures in a range of $T_{firing} \geq T_{SP,glass\ powder}$. It has been found that further processing steps may be combined with the firing of the layer. According to one embodiment it is contemplated that the layer is applied to a glass substrate, preferably a soda-lime glass or a borosilicate glass, and that the glass substrate is thermally toughened during the firing of the coating. The firing and thermal toughening are preferably effected at a temperature in a range from 500 to 1000° C.

According to a further preferred variation of the method, a crystallizable green glass is provided as the substrate. In this case, ceramization of the substrate can be achieved simultaneously with the firing of the layer. Both variants described above are advantageous in terms of energy and time savings.

A suitable test for verifying the tightness of the coatings that include pores will be explained below by way of example.

The tightness of the coating including closed pores against aqueous and oily media and cleaning agents is defined by a drop test. A drop of the liquid to be tested is applied onto the coating and allowed to act for different durations of time depending on the medium, but at least for 10 seconds.

For example, water is usually wiped off after 30 seconds, oil drops after 24 hours, and drops of cleaning agents after a few minutes. Then, the glass or glass ceramic substrate with a coating including closed pores is examined. If the glass or glass ceramic substrate is at least partially transparent in the visible range of the optical spectrum, the coating is examined from above through the substrate. The drop or the shadow of the drop must not be visible when viewed in this way. Here, shadow of the drop is understood to mean an alteration in the visual appearance of the coating, which might arise, for example, if parts of the fluid forming the drop migrate into the coating and thus cause a change in the refractive index of the coating, for example.

The coating may be assessed visually, for example by looking at it under a particular lighting, for example in a light cabin in which specific types of standard illuminant can be set and which are used, for example, in the nuancing of color mixtures.

Preferably, the coating is assessed in accordance with the standards, rules and steps for visual inspection mentioned above in order to determine the water-tightness or moisture-tightness of the coating.

In the present case, the test was performed using Sidolin as the test liquid. A layer is characterized as very good in the present case, if it exhibits no color change on the front side nor on the rear side when inspected. A layer is characterized as good in the present case, if it exhibits no color change on the front side and shows a wipeable border on the rear side after the test.

Usually, certain changes in the color appearance and/or the overall visual impression, for example when a metallic effect is altered, can be recognized when viewed in this way. Assessment may also be achieved by a measurement of the color coordinates before and after the drop is applied, in which case possible changes in the color coordinates can then be determined by comparing the measured values. When effect pigments are used, the determination of the color coordinates before and after the exposure to the fluid medium may also be made by angle-dependent measurement of the color coordinates.

Yet another aspect of the present disclosure relates to the use of a glass or glass ceramic substrate according to the present disclosure provided with a coating including closed pores according to the present disclosure, wherein the coating is designed as a barrier against the ingress and passage of fluids and has a barrier effect and the coating preferably comprises an IR-reflecting color pigment, as a viewing window in an oven or fireplace, in particular as a viewing window for a cooking oven or as a fireplace viewing window.

DETAILED DESCRIPTION

Figure 1:
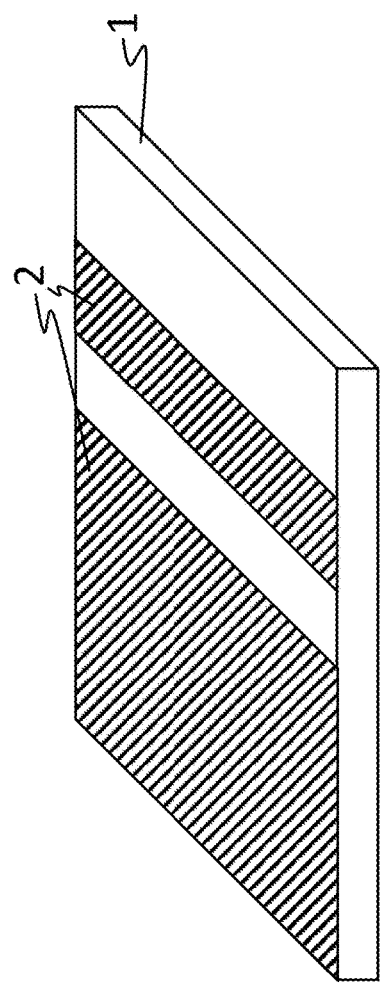
FIGS. 1 to 3 are schematic views, not drawn to scale, of a glass or glass ceramic substrate with a coating including closed pores.

FIG. 1 is a schematic view, not drawn to scale, of a glass or glass ceramic substrate 1 with a coating 2 that includes closed pores. The coating is designed as a barrier against the passage of fluids.

The coating 2 may be applied over the entire surface of the substrate 1, or else—as schematically shown in FIG. 1—only over part of the substrate. It is in particular possible for the coating 2 to be applied to the substrate 1 in the form of a predetermined pattern, for example in order to apply a lettering or a logo to the glass or glass ceramic substrate.

Figure 2:
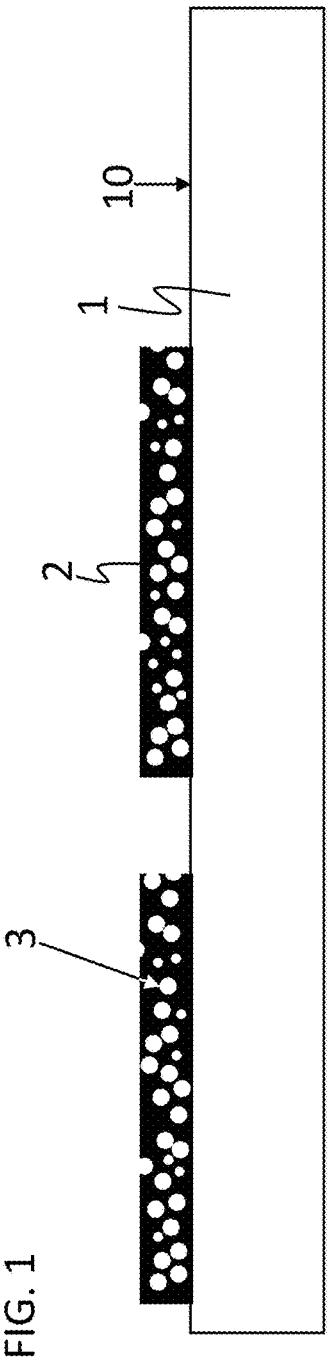

FIG. 2 is a schematic sectional view, not drawn to scale, of a glass or glass ceramic substrate 1. A surface 10 which preferably faces away from the operating person during intended use of the glass or glass ceramic substrate 1 is partly covered by a coating 2. This coating 2 includes closed pores 3. For the sake of clarity, these pores 3 have not all been designated.

Here, the pores 3 are schematically illustrated as circles or spherical sections. The pores may also be of different size and shapes, i.e., more generally, need not be spherical, not restricted to the example schematically illustrated here.

Figure 3:
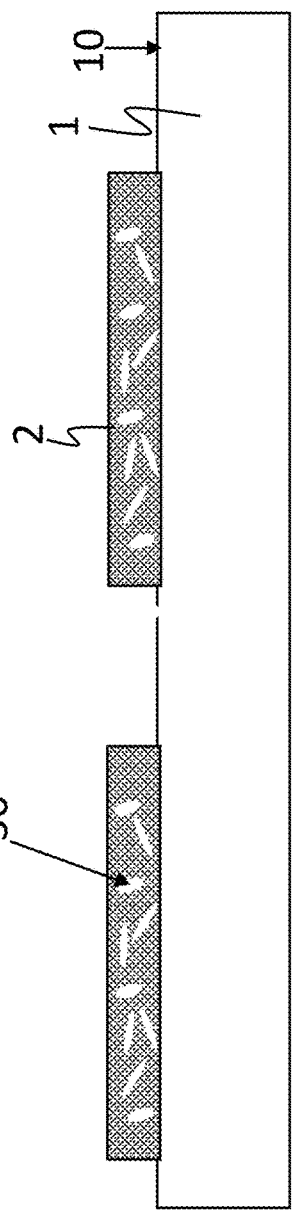

FIG. 3 is a schematic sectional view, not drawn to scale, through a further exemplary embodiment in which the surface 10 of the glass or glass ceramic substrate 1 has a porous coating 2 that includes pores 30 with an anisotropic cross-sectional shape. For example, the pores 30 have an elliptical cross section. Pores with such a shape may be obtained, for example, when using rice starch as the blowing agent.

The pores may be of different size and shapes, i.e., more generally, are not limited by the example schematically illustrated here and need not be spherical.

| Pore former | Pore size (μm) | Pore shape |
| --- | --- | --- |
| CaCO$_3$ | 5-30 | roundish |
| Sodium hydrogen phosphates | 5-30 | roundish |
| Rice starch | 0.1-5 | elongated |
| Potato starch | 10-15 | ovoid potato-shaped |
| Wheat starch | 2-10 | grain-shaped |

Furthermore, the coatings schematically illustrated in FIGS. 2 and 3 may also comprise, in addition to the closed pores 3, 30, pores located at the interface of the layer, that is to say in the form of a downward indentation of the coating. However, such pores that are open to one side have no detrimental impact on the coating 2 in terms of being effective as a barrier against the passage of fluids. Rather, what is important is that there are no continuous pores extending from the surface of the coating 2 down to the upper surface 10 of the substrate 1.

FIGS. 3a and 3b schematically illustrate embodiments in which the coating deposited on the glass 1 includes two pores, 32 and 33, respectively. In both cases, these are closed pores. FIG. 3a shows an embodiment with largely spherical pores 32. Such pores may be obtained by using calcium carbonate as a blowing agent, for example. In contrast, the pores 33 shown in FIG. 3b have an elliptical cross-sectional shape and hence an anisotropic structure. Pores with such a shape may be obtained by using rice starch as a blowing agent, for example.

Figure 4A:
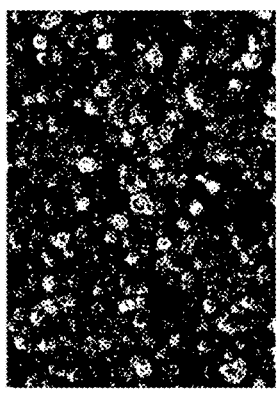
FIGS. 4a to 4d, 5, 6a to 6d show micrographs of coatings that include closed pores.
Figure 4B:
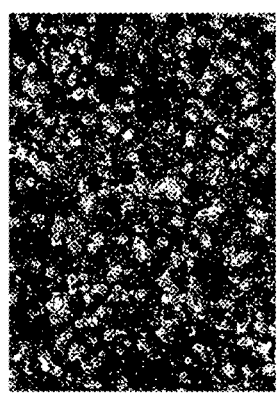
Figure 4C:
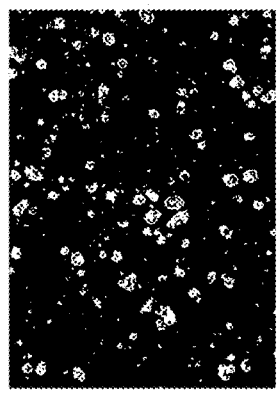
Figure 4D:
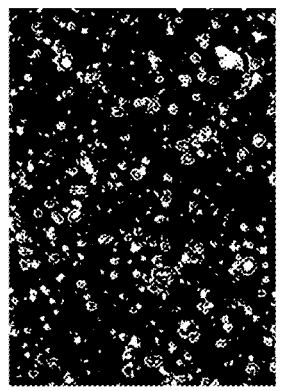

FIGS. 4a-4d show several photographs which are light microscopic images of coatings 2 according to embodiments of the disclosure, which were using screens of different sizes and fired at different temperatures. The two coatings on the left were each applied using a 77 mesh screen. The sample shown far left, in FIG. 4a, was fired at approximately 750° C., and the next sample on the left, in FIG. 4b, was fired at approximately 720° C. The two samples on the right, in FIGS. 4c and 4d, show coatings which were printed using a 100 mesh screen. The sample shown half right, in FIG. 4c, was fired at approximately 750° C., the samples shown far right, in FIG. 4d, was fired at approximately 720° C.

What is particularly evident is the impact of temperature on the formation of the pores: while the samples fired at approximately 750° C. tend to have fewer, but larger pores, the samples fired at approx. 720° C. include more pores, with smaller dimensions.

Figure 5:
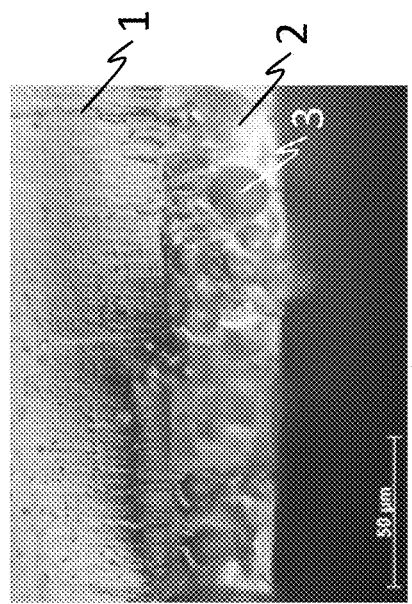
Figure 6A:
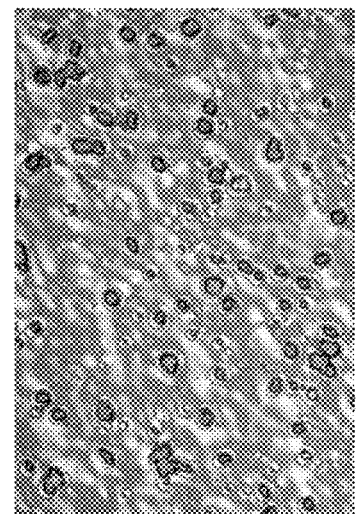
Figure 6B:
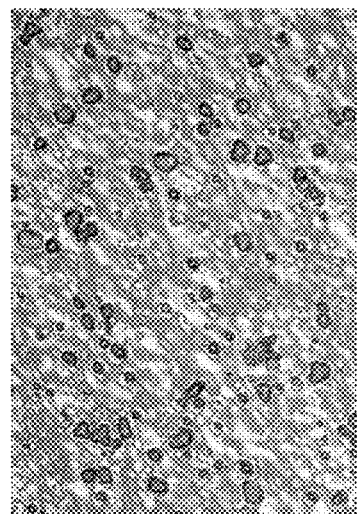
Figure 6C:
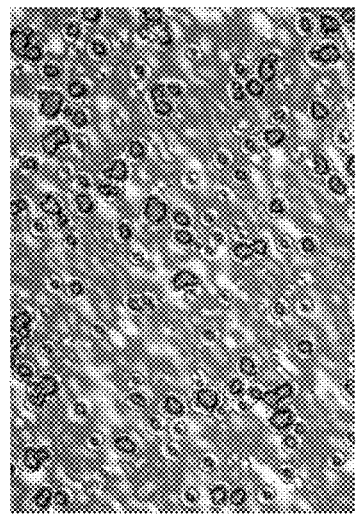
Figure 6D:
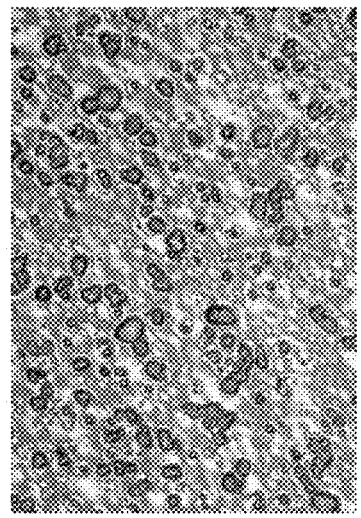

FIG. 5 shows a micrograph of a section through a substrate 1 to which a coating 2 was applied that includes closed samples 3. Sodium hydrogen phosphate was added to the glass 2 as a blowing agent, in an amount of 10 vol %.

FIGS. 6a to 6d show further images of a coating 2 including closed pores 3. The coating was obtained by mixing glass 1 with calcium carbonate. For the samples of FIGS. 6a and 6b, 5 vol % of calcium carbonate was added to the glass 1, for the samples of FIGS. 6c and 6d 10 vol % of calcium carbonate. The samples of FIGS. 6a and 6c were fired at approximately 750° C., the samples of FIGS. 6b and 6d at approximately 720° C. What is clearly recognizable is the influence of the amount of blowing agent which leads to a significant increase in the number of bubbles.

Figure 7:
FIG. 7 shows transmittance profiles of one non-coated and several coated glass or glass ceramic substrates.

FIG. 7 shows transmittance profiles of several glass ceramic substrates in the wavelength range from approximately 300 nm to 5000 nm. Curve 4 shows the transmittance profile for a non-coated glass ceramic substrate. In the visible spectral range, i.e. from approx. 380 nm to approx. 780 nm, transmittance is high, so the substrate can therefore be described as being transparent in this range. Thus, structures located below such a substrate would be visible to a user.

This changes when a coating according to embodiments of the disclosure is applied.

Curve 5 shows the case of a substrate which in its non-coated state exhibits a transmittance similar to that of curve 4, and for which a cobalt-iron spinel with nanoscale particle size was used as a pigment. No blowing agents were added. Curve 6 represents a coating which, in addition to the nanoscale cobalt-iron spinel (15 vol %), furthermore comprises 20 vol % of sodium dihydrogen phosphate as a blowing agent.

Curve 7 represents a coating which, instead of the pigment used for the coating of curve 6, comprises Co—Mn—Fe—Cr spinel pigment (d50~0.5 μm), with an otherwise unchanged composition. For curve 8, chromium-iron-nickel black spinel (d50~1-2.5 μm) was used as the pigment, with an otherwise unchanged composition.

It can be seen that in particular the substrates provided with coatings according to embodiments of the present disclosure exhibit transmittance profiles in which a very good covering effect is achieved in the visible. This is illustrated by curves 6 to 8. So, transmittance of the coated substrate is further reduced by the pores, and hence opacity is increased. Opacity represents the reciprocal of transmittance.

In optics, absorbance A or optical density is the opacity O formulated as decadic logarithm in line with human perception and thus a measure of the attenuation of radiation (e.g. light) after having passed through a medium (Wikipedia https://de.wikipedia.org/wiki/Extinktion (Optik)).

Here, in-line transmittance is represented (in contrast to total transmittance). When measuring total transmittance, the entire light that is scattered forward is captured on a detector, whereas for in-line transmittance only the forward directed light is captured on the detector (given an opening angle of normally 5° of the measuring devices, also the scattered light exiting at this small angle). The difference between total and in-line transmittances gives a measure of scattering. In the present case, with regard to the layer, scattering is in particular caused by the pigment particles of the layer and the pores.

Figure 8:
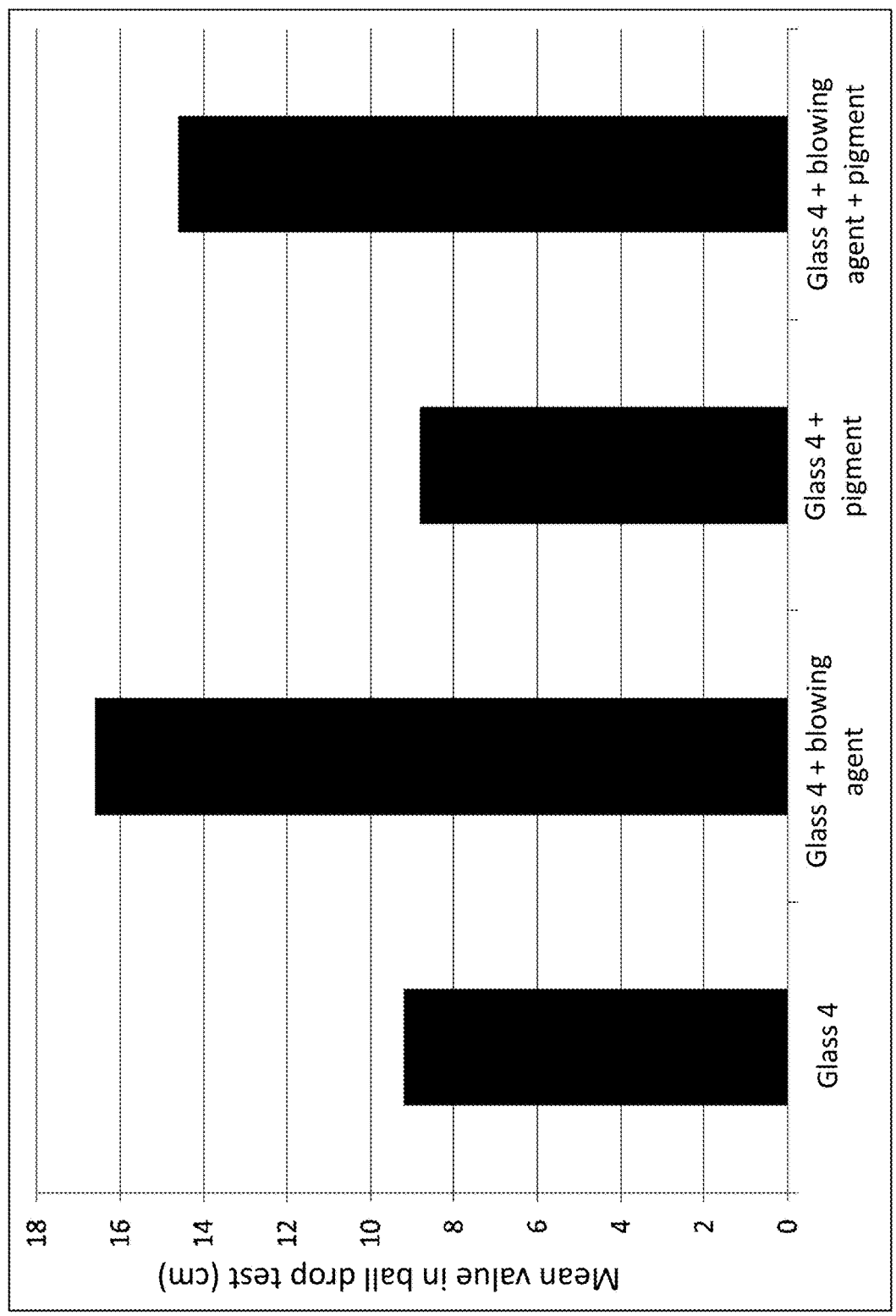
FIG. 8 shows results of strength tests on differently coated substrates.

FIG. 8 shows how the strength, as determined by what is known as a ball drop test, changes for a coated substrate depending on the composition of the coating.

If the coating comprises only a glass or a glass together with a pigment, only very low strength values are obtained in the ball drop test. These are layers which do not include closed pores and therefore do not represent layers according to the invention.

In contrast, if a coating is produced by applying a suspension which comprises a blowing agent in addition to glass or glass and pigment, layers are formed in accordance with embodiments of the present disclosure which include closed pores. A substrate coated in this way exhibits significantly higher strength than if no blowing agent is used.

Visual inspection of the coating according to embodiments of the present disclosure is performed by the following steps: applying a liquid onto a surface area of the coating of the substrate; allowing the liquid to act for a duration of 15 seconds; wiping off residual moisture of the liquid using a dry cloth; turning over the substrate so that the coating is disposed on the side of the substrate facing away from the inspecting person; and verifying, by visual inspection, whether a color change is recognizable in the area or in an area adjacent to the area, wherein
a) the visual inspection is performed in daylight according to standard illuminant D65 or under lighting of an incandescent lamp, compact fluorescent lamp, fluorescent lamp, or light-emitting diode;
b) illuminance is at least 500 lx at a distance of less than 600 mm from the coating, i.e. from the inspected area; and
c) the viewing angle of the inspecting person is between 5° and 90°, preferably at least 30°.

Figures 9, 10:
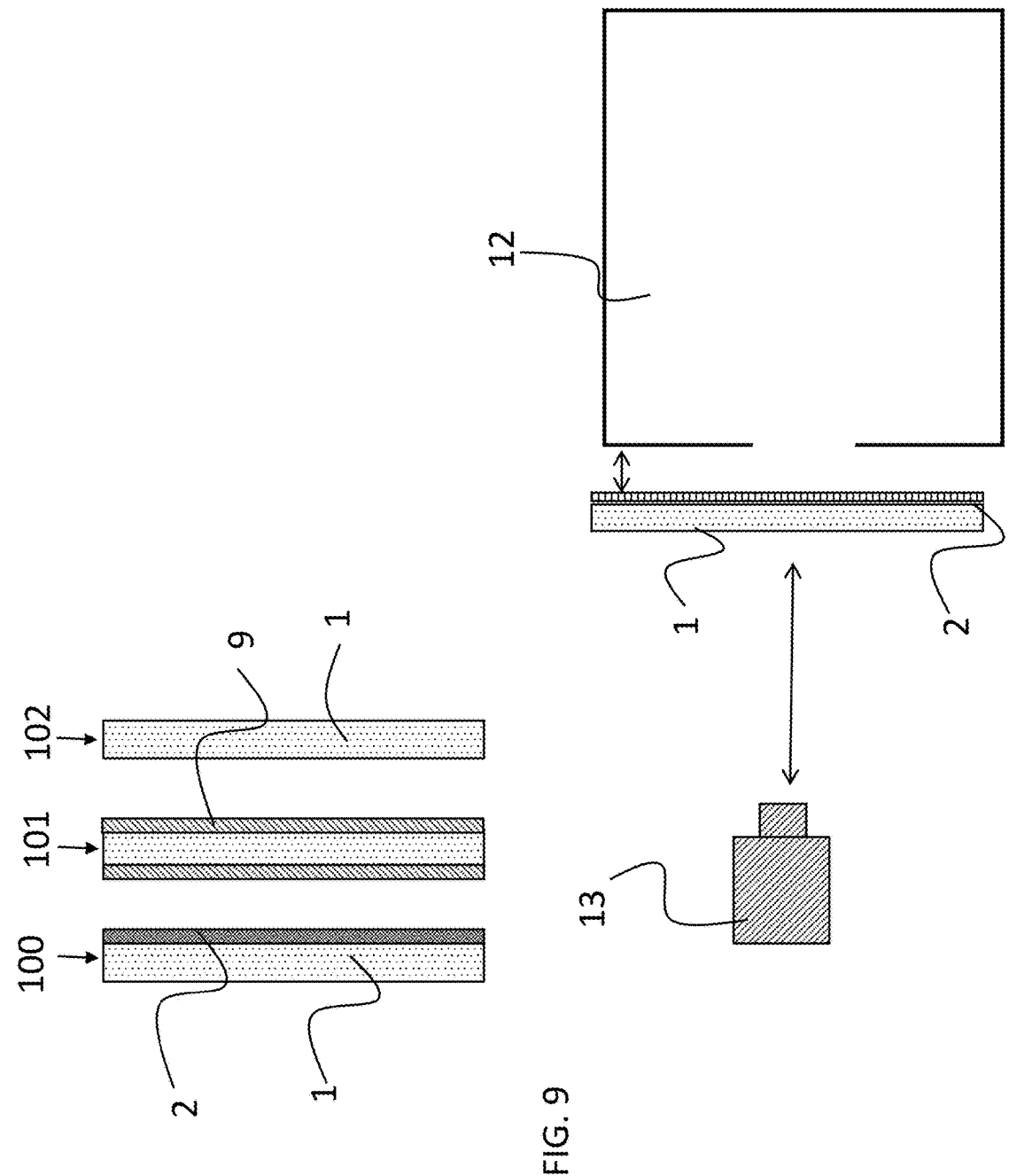
FIG. 9 is a schematic view of the configuration of a cooking oven door.
FIG. 10 is a schematic view of the measurement setup for determining the surface temperature of the outer oven door pane.

FIG. 10 schematically shows a measurement setup for determining the surface temperatures of a coated glass sheet under laboratory conditions. In this case, a laboratory oven 12 is heated to a temperature of 450° C. The oven has an opening with a diameter of 3 cm. The glass pane 1 with the coating 2 to be measured is placed at a distance of 2.5 cm from this opening with the coating 2 facing the opening of the oven. The surface temperature of the coated glass sheet 1 is determined using a pyrometer 13 (impac, IE 120/82L), with the focal point adjusted to the outer surface of the decorated sheet. The pyrometer 13 is arranged behind a glass substrate 14 and at a distance of 50 cm from the glass sheet 1 to be measured.

Figure 11:
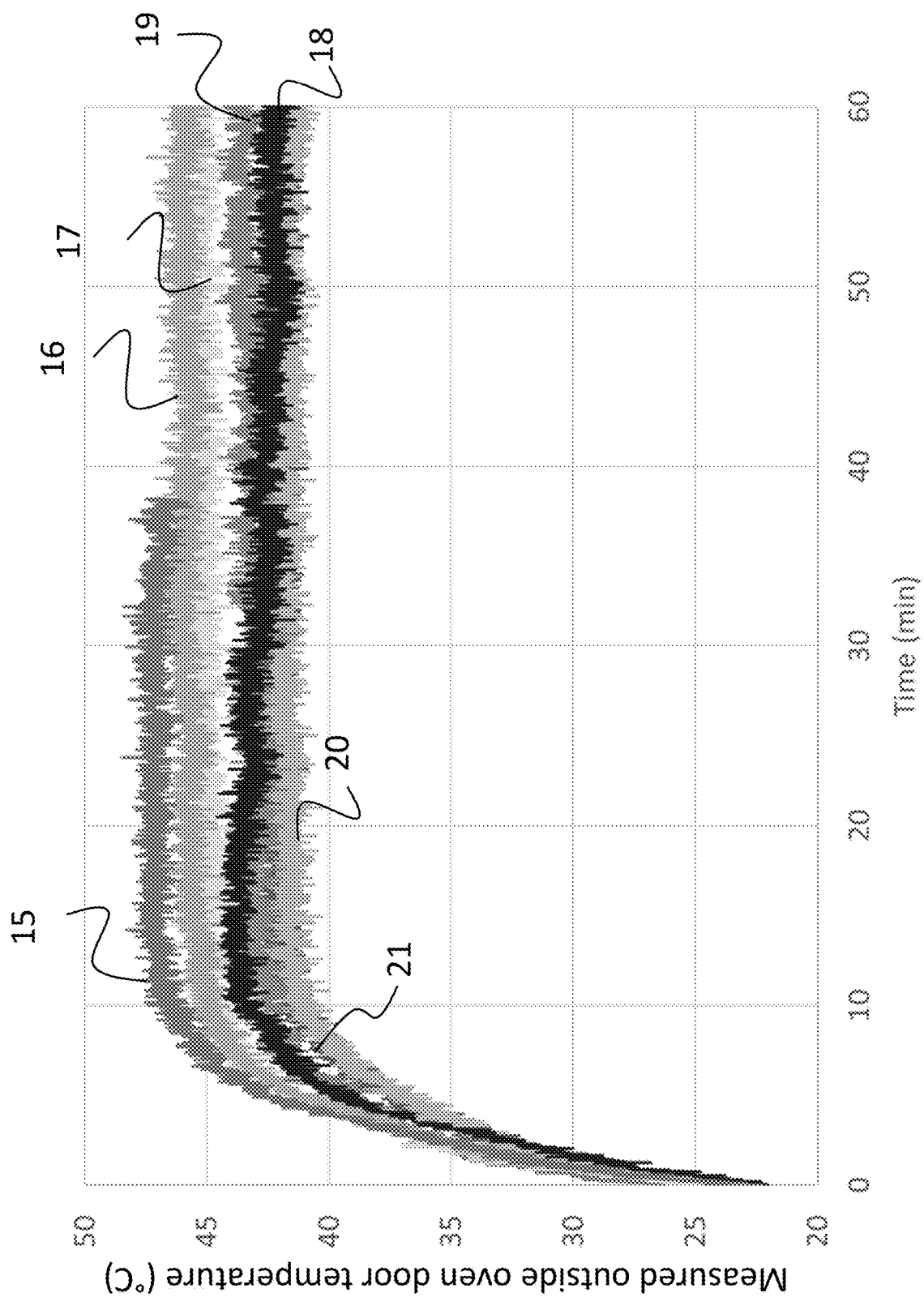
FIG. 11 is a graph of measured temperature profiles of the maximum temperature of the outer oven door pane of various exemplary embodiments which differ with regard to the porosity of the coating, at an operating temperature of the oven of 450° C.
Figure 12:
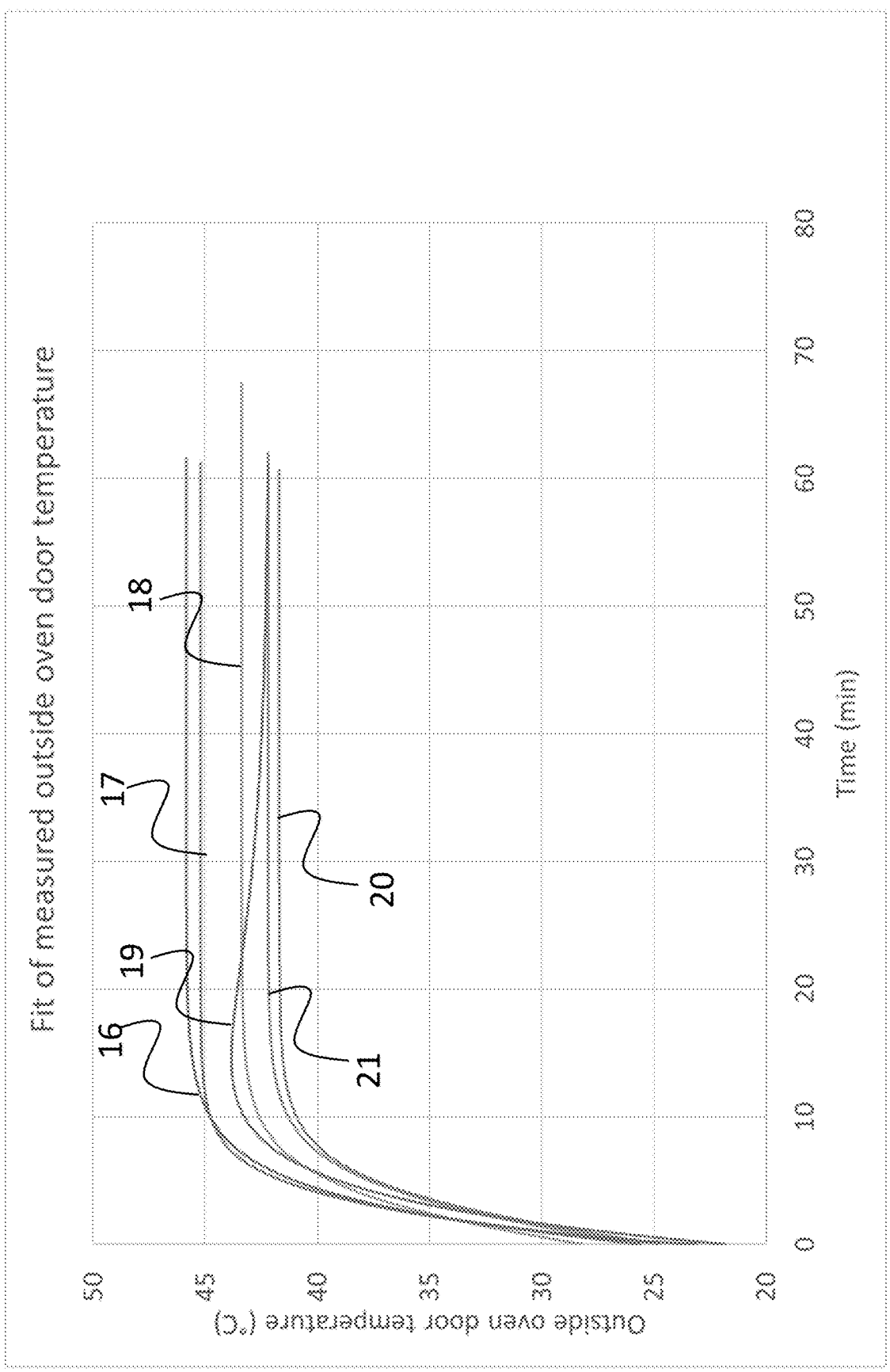
FIG. 12 shows the averaged values of the temperature profiles shown in FIG. 11.

FIGS. 11 and 12 show the temperature profile on the outer surface of several coated substrates as a function of operating time. Here, the oven was heated to a temperature of 450° C., and subsequently the surface temperature of the coated glass sheet was determined as a function of operating time using the measurement device shown in FIG. 10.

FIG. 11 shows the maximum temperatures measured in this way, as a function of operating time of the oven. FIG. 12 shows a fit of the temperature profiles shown in FIG. 11, obtained by averaging.

Curves 15, 16, and 17 correspond to temperature profiles of comparative examples in which the coating has IR-reflecting pigments but is not porous. Curves 18 to 21 can be associated with temperature profiles of exemplary embodiments in which the coating includes closed pores and IR-reflecting pigments.

The comparison examples and the exemplary embodiments are characterized in more detail in the table below. The examples comprise a soda-lime glass as the substrate, glass 1 from the table was used as glass frit or glass flux. Firing was performed in the laboratory oven at 680° C. for 15 minutes, while the samples were supported horizontally.

| Curve | Pigment (vol %) | Blowing agent (vol %) | Type of blowing agent | $T_{max}$ (° C.) after 1 h at 450° C. | Optical density (glass side facing upwards) | L*a*b* (SCE; (coated side facing upwards) | Gloss (60°) | Sclerometer (10N) | Sidolin test (porosity) |
|---|---|---|---|---|---|---|---|---|---|
| 16 | 20 | 0 | N/A | 47.6 | 2.6 | 34.63/0.45/−3.71 | 18.5 | ok | very good |
| 17 | 17.5 | 0 | N/A | 46.9 | 2.1 | 36.04/0.44/−4.09 | 55.9 | ok | very good |
| 21 | 17.5 | 20 | CaCO$_3$ | 43.8 | 2.2 | 34.63/0.45/−3.71 | 4.0 | ok | good |
| 20 | 17.5 | 10 | CaCO$_3$ | 43.2 | 2.6 | 31.58/0.49/−3.56 | 17.5 | ok | good |
| 19 | 17.5 | 20 | rice starch | 45.7 | 2.1 | 21.38/0.6/−1.75 | 41.0 | ok | very good |
| 18 | 17.5 | 10 | rice starch | 45.4 | 2.6 | 18.56/0.65/−1.95 | 50.5 | ok | very good |

Liquids that may be used include water, oil, alcohol, and/or glass cleaning agent.

The aforementioned visual inspection in particular includes the examination of whether a water mark and/or a water stain is noticeable from the side of the substrate opposite the coated side. Here, a layer is described as very good if after the test no color change on the front side nor on the rear side is revealed. A layer is described as good if after the test no color change on the front side and exhibits a wipeable border on the rear side is revealed.

FIG. 9 schematically shows a possible configuration of a cooking oven door. Here, the outer pane 100 has a porous coating 3 on one side thereof. The non-coated side of the substrate faces outwards. The intermediate pane 101 and the inner pane 102 of the oven door are coated with a coating 9 on one side thereof. Coating 9 may include transparent conductive oxides, for example.

Characterization of the samples shown in FIGS. 11 and 12

The coatings of comparative examples 16 to 18 were produced without using blowing agents. Examples 19 to 21, by contrast, are porous coatings. For producing these coatings, blowing agents were used as listed in the table above, and therefore the coatings obtained in this way include closed pores. All of the temperature profiles shown in FIGS. 11 and 12 were obtained using the measurement setup shown in FIG. 10. The respective coating compositions were applied to the substrate by screen printing using a 77T mesh.

The coatings of all examples 15 to 21 contain IR-reflecting pigments, so that these coatings exhibit good IR reflectivity. This manifests in particular in the fact that for all examples the measured temperature of the outer pane was less than 50° C., for an oven operating time of 60 minutes at 450° C. What becomes evident from this is that the IR reflectivity of the coating can be significantly enhanced through the porosity thereof. For samples 18 to 21, lower temperatures were measured than for the comparative samples 15 to 17 with a dense coating. The temperature difference measured after 60 minutes of operation between the dense sample 15 and the porous sample 20 is more than 4° C. It is assumed that the pores within the coating represent structures which additionally scatter the IR radiation.

The impact of this positive effect on the maximum surface temperature of the pane seems to be dependent on the shape of the pores. The blowing agent used in samples 18 and 19 was rice starch, while $CaCO_3$ was used in samples 20 and 21. When rice starch is used as a blowing agent, anisotropic pores with an ellipsoidal cross section will preferably be formed, while the use of $CaCO_3$ as a blowing agent leads to largely spherical pores (cf. FIGS. 2 and 3).

FIG. 12 shows that for the coated glasses 20 and 21 which have pores of spherical or largely spherical shape, the isolation effect is higher than for the coated glasses 18 and 19 that have a coating with ellipsoidal or rice-shaped pores.

FIG. 12 moreover shows that the percentage of blowing agent in the paste has an impact on the IR reflection of the corresponding coating. Samples 20 and 21 only differ in their content of blowing agent. While the amount of blowing agent in the paste for producing coating 21 is 20 vol %, the corresponding paste for producing coating 20 contains only 10 vol % of $CaCO_3$ as the blowing agent. And, sample 20 exhibits a better isolation effect than sample 21, so that under comparable conditions and after an operating time of 180 minutes the maximum temperature of sample 20 is lower than the maximum temperature of sample 21 by 0.8° C.

An excessive amount of blowing agents in the paste results in a formation of so many pores that they in part combine so that open pores are created. An indication of open pores and an uneven surface associated therewith. It is assumed here that closed pores promote IR reflectivity.

Another way of increasing IR reflectivity of the coating is to increase layer thickness, for example by repeatedly applying the corresponding paste or suspension to the substrate. This becomes evident from the table below. Here, the samples were applied onto the substrate by screen printing using a 77T mesh, dried and optionally printed a second time using a 77T mesh before the coating was fired while being supported horizontally in the laboratory oven for 15 minutes at 680° C. The table indicates the number of printing processes (single or double print) and the maximum temperature determined with the measurement setup shown in FIG. 10 on the outer surface of the pane after 60 minutes of operation of the oven at a temperature of 450° C.

LIST OF REFERENCE NUMERALS

1 Glass or glass ceramic substrate
2 Coating including closed pores
3, 30 Closed pores
4 Transmittance profile of non-coated substrate
5 Transmittance profile of substrate not coated according to the invention
6,7,8 Transmittance profiles of substrates coated according to embodiments of the disclosure
9 Coating comprising conductive oxides
10 Surface of substrate 1
12 Laboratory oven
13 Pyrometer
15, 16, 17 Temperature profiles of comparative examples with dense coatings
18, 19, 20, 21 Temperature profiles of exemplary embodiments with porous coatings
100 Outer oven door pane
101 Intermediate oven door pane
102 Inner oven door pane

What is claimed is:

1. A method for coating a glass or glass ceramic substrate, comprising the steps of:
   preparing a suspension comprising a glass powder and an agent that decomposes upon temperature increase to form a volatile substance;
   applying the suspension to the glass or glass ceramic substrate so that at least part of the substrate is covered by the suspension;
   fixing the suspension applied on the substrate at a first temperature between 0° C. and 300° C. to form a substrate with a fixed suspension;
   annealing the substrate with the fixed suspension at a second temperature between 450° C. and 900° C. so that the glass particles melt and the agent decomposes to form the volatile substance and to cause formation of a coated substrate with an enamel coating that has closed pores; and
   cooling the coated substrate to room temperature.

2. The method of claim 1, wherein the coating is a barrier against passage of fluids.

3. The method of claim 2, wherein the closed pores have a size between 0.1 μm and 30 μm.

4. The method of claim 1, wherein the substrate has a coefficient of thermal expansion of less than $5*10^{-6}$/K in a range from 20° C. to 700° C.

5. The method of claim 1, wherein the second temperature is between 450° C. and 750° C.

| Sample ID | Number of prints | Percentage of pigment [vol %] | Percentage of blowing agent [vol %] | Blowing agent used | $T_{max}$ (° C.) after 1 h heating at 450° C. | Optical density (glass side facing upwards) | L*a*b* (SCE; coated side facing upwards) | Gloss (60°) | Sclerometer (10N) | Sidolin test (porosity) |
|---|---|---|---|---|---|---|---|---|---|---|
| 21  | 1 | 17.5 | 20 | $CaCO_3$    | 43.8 | 2.2 | 34.63/0.45/−3.71 | 4.0  | ok | good |
| 21a | 2 | 17.5 | 20 | $CaCO_3$    | 41.3 | 3.2 | 36.04/0.44/−4.09 | 1.4  | ok | good |
| 19  | 1 | 17.5 | 20 | rice starch | 45.7 | 2.1 | 21.38/0.6/−1.75  | 41.0 | ok | very good |
| 19a | 2 | 17.5 | 20 | rice starch | 45.2 | 4.2 | 23.49/0.42/−2.15 | 35.4 | ok | very good |
| 18  | 1 | 17.5 | 10 | rice starch | 45.4 | 2.6 | 18.56/0.65/−1.95 | 50.5 | ok | very good |
| 18a | 2 | 17.5 | 10 | rice starch | 44.9 | 4.7 | 19.86/0.40/−2.38 | 48.9 | ok | very good |

6. The method of claim 1, wherein the step of applying the suspension comprises applying the suspension to the substrate in a laterally patterned form of a predetermined pattern.

7. The method of claim 6, wherein the laterally patterned form comprises at least one portion of the substrate that remains free of the suspension.

8. The method of claim 1, further comprising, after the suspension applying step and before the annealing step, the step of applying a non-adhering cover sheet to the suspension.

9. The method of claim 8, wherein the non-adhering cover sheet remains in place during the fixing and annealing steps.

10. The method of claim 1, wherein the applying step comprises a process selected from a group consisting of printing, ink-jet printing, offset printing, pad printing, screen printing, rolling, flooding, dipping, spraying, doctor blading, and spin coating.

11. The method of claim 1, further comprising the step of visually inspecting the coating.

12. The method of claim 11, wherein the step of visually inspecting the coating comprises:
    applying a drop of a liquid onto an area of the coating of the substrate;
    allowing the liquid to act for a duration of 15 seconds;
    wiping off residual moisture of the liquid using a dry cloth;
    turning over the substrate so that the coating is disposed on the side of the substrate facing away from an inspecting person; and
    visually verifying whether a color change is recognizable in the area or in a region adjacent to the area.

13. The method of claim 12, wherein the visually verifying is performed in daylight of standard illuminant D65 or under lighting from a source selected from a group consisting of an incandescent lamp, a compact fluorescent lamp, a fluorescent lamp, and a light-emitting diode, the light source having illuminance of at least 500 lx at a distance of less than 600 mm from the area, and at a viewing angle between 5° and 90°.

14. The method of claim 12, wherein the fluid liquid is selected from a group consisting of water, alcohol, and glass cleaning agent.

15. The method of claim 1, wherein the coating comprises at least 95 wt. % of inorganic constituents and has a thickness between 1.5 μm and 50 μm.

16. The method of claim 1, wherein the coating is temperature resistant for temperatures greater than 400° C.

17. The method of claim 1, wherein the substrate is a sheet-like substrate having a thickness between at least 1 mm and at most 10 mm.

18. The method of claim 1, wherein the coating comprises a material selected from a group consisting of a colorant agent, an effect agent, a color pigment, an effect pigment, and any combinations thereof.

19. The method of claim 1, wherein the coating is opaque to electromagnetic radiation in a wavelength range from 380 nm to 780 nm.

20. The method of claim 1, wherein the coating has a $\tau_{vis}$ (in-line transmittance) with a value of less than 20% in a wavelength range of visible light.

21. A method for coating a glass or glass ceramic substrate, comprising the steps of:
    preparing a suspension comprising a glass powder and an agent that decomposes upon temperature increase to form a volatile substance;
    applying the suspension to the glass or glass ceramic substrate so that at least part of the substrate is covered by the suspension;
    fixing the suspension applied on the substrate at a first temperature between 0° C. and 300° C. to form a substrate with a fixed suspension;
    annealing the substrate with the fixed suspension at a second temperature between 450° C. and 900° C. so that the agent decomposes to form the volatile substance and to cause formation of a coated substrate with a coating that has closed pores;
    cooling the coated substrate to room temperature; and
    applying, after the suspension applying step and before the annealing step, a non-adhering cover sheet to the suspension.

22. The method of claim 21, wherein the non-adhering cover sheet remains in place during the fixing and annealing steps.

* * * * *